(12) United States Patent
Tobiason et al.

(10) Patent No.: US 7,656,425 B2
(45) Date of Patent: Feb. 2, 2010

(54) ROBUST FIELD OF VIEW DISTORTION CALIBRATION

(75) Inventors: Joseph Daniel Tobiason, Woodinville, WA (US); Yuhua Ding, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 527 days.

(21) Appl. No.: 11/395,776

(22) Filed: Mar. 31, 2006

(65) Prior Publication Data

US 2007/0229665 A1  Oct. 4, 2007

(51) Int. Cl.
H04N 17/00 (2006.01)
H04N 5/225 (2006.01)
H04N 5/228 (2006.01)
G06K 9/36 (2006.01)
H04N 7/18 (2006.01)
G06T 5/00 (2006.01)

(52) U.S. Cl. ............... 348/187; 348/188; 348/207.1; 348/208.99; 348/208.7; 348/335; 348/86; 348/87; 382/291; 358/3.26

(58) Field of Classification Search ......... 348/187–189, 348/335, 208.99, 208.7, 208.11; 382/291, 382/292; 359/642; 358/3.26
See application file for complete search history.

(56) References Cited

U.S. PATENT DOCUMENTS

| | | | | | |
|---|---|---|---|---|---|
| 6,002,525 | A | * | 12/1999 | Poulo et al. | 359/642 |
| 6,097,430 | A | * | 8/2000 | Komiya et al. | 348/218.1 |
| 6,437,823 | B1 | * | 8/2002 | Zhang | 348/187 |
| 6,937,282 | B1 | * | 8/2005 | Some et al. | 348/335 |
| 2003/0222984 | A1 | * | 12/2003 | Zhang | 348/187 |
| 2004/0146202 | A1 | * | 7/2004 | Hyoki | 382/209 |
| 2004/0233280 | A1 | * | 11/2004 | Aoyama | 348/135 |
| 2005/0185049 | A1 | * | 8/2005 | Iwai et al. | 348/47 |
| 2005/0213159 | A1 | * | 9/2005 | Okada et al. | 358/3.26 |
| 2005/0213846 | A1 | * | 9/2005 | Matsuda et al. | 382/275 |
| 2005/0253870 | A1 | * | 11/2005 | Kotake et al. | 345/633 |
| 2005/0261849 | A1 | * | 11/2005 | Kochi et al. | 702/85 |
| 2007/0024712 | A1 | * | 2/2007 | Morita et al. | 348/187 |

OTHER PUBLICATIONS

Zhang, Z., "A Flexible New Technique for Camera Calibration," *Technical Report MSR-TR-98-71*:1-21, Microsoft Research, Dec. 2, 1998.

(Continued)

*Primary Examiner*—Jason Chan
*Assistant Examiner*—Michael Osinski
(74) *Attorney, Agent, or Firm*—Christensen O'Connor Johnson Kindness PLLC

(57) ABSTRACT

A method characterizes field of view (FOV) distortion and may correct machine vision measurements accordingly. A plurality of distorted images are acquired, with the same calibration target at a plurality of spaced-apart locations within the FOV. The method analyzes the images and determines distortion parameters that can correct the distortions in the images such that features included in the calibration target pattern achieve a sufficient or optimum degree of congruence between the various images. Distortion parameters may be determined for each optical configuration (e.g., lens combination, magnification, etc.) that is used by a machine vision inspection system. The distortion parameters may then be used to correct FOV distortion errors in subsequent inspection and measurement operations.

13 Claims, 13 Drawing Sheets

OTHER PUBLICATIONS

*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7.0, 1st ed., Manual No. 99MCB225A, Series No. 359, Mitutoyo Corporation & Micro Encoder Inc., Kanagawa, Japan, Jan. 2003.

* cited by examiner

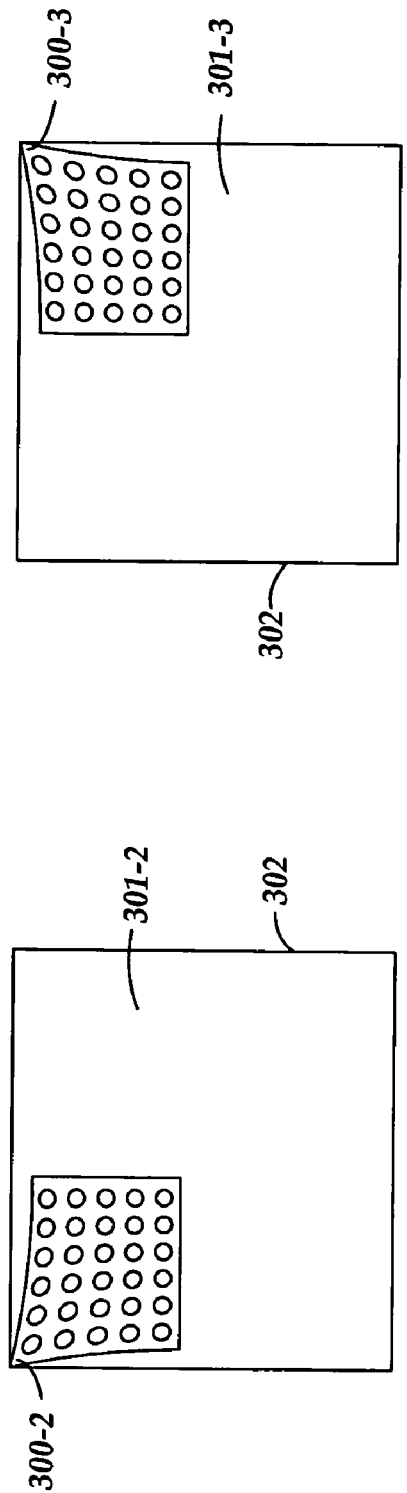
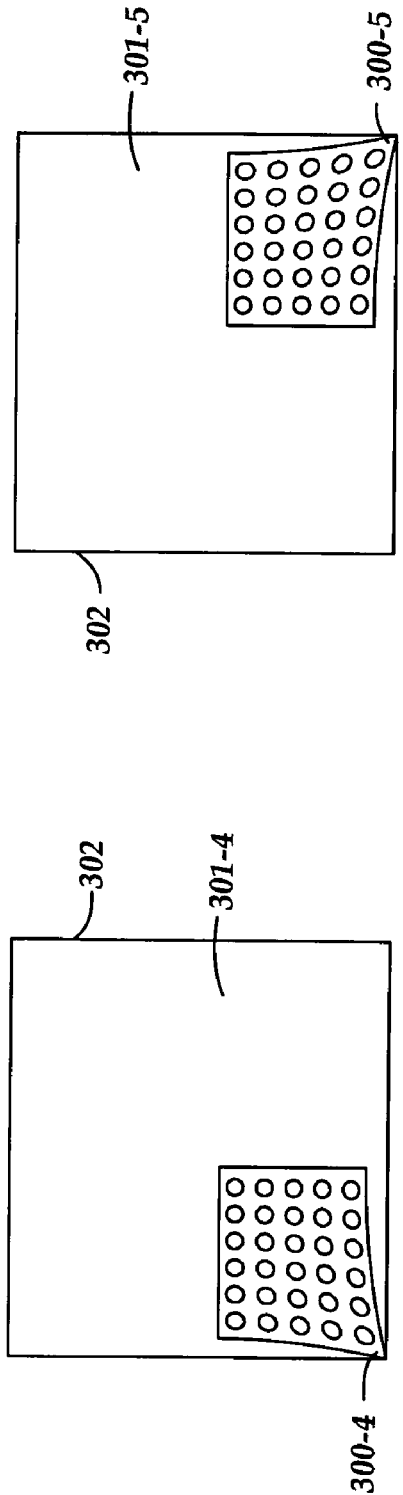

ROBUST FIELD OF VIEW DISTORTION CALIBRATION

TECHNICAL FIELD

This invention relates to machine vision metrology systems, and more particularly, to a field of view (FOV) distortion correction system and method.

BACKGROUND

Precision machine vision inspection systems (or "vision systems" in short) can be used to obtain precise dimensional measurements of inspected objects. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are described in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, uses a microscope-type optical system to provide images of a workpiece at various magnifications, and moves the stage to traverse the workpiece surface beyond the limits of any single video image.

Measurement accuracy in the micron or sub-micron range may be desired in such systems. At such accuracy levels, even a slight FOV distortion due to optical system imperfections may lead to unacceptable measurement errors. The present invention is directed to providing a system and method for correcting the FOV distortion to a refined level in a precision machine vision inspection system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Systems and methods are presented that accurately characterize field of view (FOV) distortion and that may correct measurement errors due to FOV distortion (sometimes referred to as "FOV distortion errors") accordingly. FOV distortion causes measurement errors that depend on where a measurement is performed inside the FOV. It should be appreciated that in precision machine vision inspection systems such FOV distortion errors may be very small, e.g., they may be at the level of small part of the pixel spacing and/or at a sub-micron level in a measurement result. Nevertheless, such errors may be a limiting factor in the accuracy of some precision machine vision systems. Therefore, even a small reduction in such errors may be significant.

According to one aspect of the method, an optical configuration is used to acquire a plurality of distorted (uncorrected) images, with the same pattern of features (e.g. a calibration target) at a plurality of locations and/or orientations within the FOV. The images are analyzed and distortion parameters are determined that can correct the distortion in each image such that features included in the pattern achieve a sufficient or optimum degree of congruence between the various images. The distortion parameters may then be used to correct FOV distortion errors in subsequent inspection and measurement operations that use the optical configuration. Respective distortions may be characterized, i.e., distortion parameters may be determined, for each respective optical configuration (e.g., lens combination, magnification, etc.) that is used by a machine vision inspection system.

In some embodiments, the FOV distortion may be assumed to be radially symmetric, and the distortion parameters comprise a radial distortion coefficient, and the coordinates of a center of distortion. In one embodiment, the distortion of an image point is assumed to be proportional to the cube of the distance of the image point from the center of distortion, and the radial distortion coefficient is determined accordingly.

The fabrication and certification of calibration target dimensions with a measurement uncertainty that is significantly less than the FOV distortion errors may be prohibitively expensive, impractical or impossible. Therefore, one advantageous feature of a method according to the present invention is that it does not require the calibration target features to be precisely fabricated or to have precisely known dimensions, in order to determine FOV distortion parameters that are able to correct subpixel and/or sub-micron measurement errors.

According to another feature of the invention, the same calibration target pattern may be imaged (with distortion) at a plurality of locations and/or rotations in the FOV. Although not a requirement, in some embodiments it is advantageous if a rotation and/or translation of the calibration target pattern between images is configured such that at least some of the features of the calibration target pattern change their radial distance from the center of the FOV by at least 15% of a minimum dimension of the FOV. In another embodiment, a rotation and/or translation of the calibration target pattern between images may change the radial distance of some features from the center of the FOV by at least 25% of a minimum dimension of the FOV. An analysis of the resulting plurality of images determines distortion parameters that, when applied, transform the (X,Y) coordinates in each image such that the pattern features are nominally congruent, or sufficiently congruent to achieve a desired measurement repeatability regardless on the measurement location in the FOV. Accordingly the method is flexible and accurate for application in calibrating high-precision metrology systems. In various embodiments, a measurement repeatability of better than 1/10 pixel, 1/20 pixel, or 1/40 of a pixel may be provided, for a distortion corrected measurement repeated throughout the FOV.

According to another feature of the invention, the distortion parameters may be determined in terms of the pixel coordinate system of the camera such that motion control system measurement errors need not enter into the determination of the distortion parameters or the subsequent measurement corrections, for distances within the FOV.

According to another feature of the invention, determining the FOV distortion parameters may include defining a set of intra-pattern "undistorted relationship vectors". Conceptually, intra-pattern undistorted relationship vectors are intended to depend only on the actual, fixed-feature relationships in a calibration target pattern. Thus, an intra-pattern undistorted relationship vector that is estimated from an image should nominally remain the same regardless of which particular image is used for its determination, provided that any distortion in the image is properly compensated based on accurately determined distortion parameters. Conversely, in various embodiments according to this invention, a set of distortion parameters is determined according to a constraint that minimizes, or sufficiently reduces, the differences between intra-pattern undistorted relationship vectors that are estimated from each of a plurality of images that image the calibration target pattern in different locations in the FOV. In various embodiments, a minimization or optimization technique is used to determine a set of distortion parameters that minimizes the variances of the corresponding x- and y-components of several "x,y-type" intra-pattern undistorted relationship vectors estimated from various images. In various other embodiments, the distortion parameters may be determined by other types of mathematical operations, such as non-linear least squares fitting, subject to the constraint that the undistorted relationship vectors determined from various calibration target pattern images should be nominally the same.

In some embodiments, an undistorted relationship vector may be based on a derived undistorted feature location, that is, a location that does not coincide with any single physical calibration target feature. In one embodiment, a derived undistorted feature location may comprise the average of a plurality of undistorted feature locations.

In some embodiments of the method, a distortion calibration target may be used that includes a plurality of distortion calibration target patterns at various scales that are suitable for determining distortion parameters at various magnifications. In some embodiments, the calibration target pattern that appears in each calibration image may have an area that is approximately ¼ of the area of the FOV at the magnification that is used for the calibration images. In one embodiment it may have dimensions such that it approximately fills one quadrant of the FOV. In various other embodiments, the calibration target pattern that is used in each calibration image may have an area that is at least ⅟₁₆ of the area of the FOV, and at most ½ the area of the FOV, at the magnification that is used for the calibration images.

In various embodiments of the method, a distortion calibration target pattern carries a desired number of features of a desired size. In various embodiments, the pattern may include as few as 3 features. However, it may be advantageous to include at least 9 features, and more advantageous to include at least 16 features, in various other embodiments. In various embodiments, it is advantageous to provide features that are small enough to avoid significant shape distortion, large enough to obtain sufficient measurement repeatability, and spaced far enough apart that measurements of one feature are not affected by that feature's neighbors. In some embodiments a calibration target feature may have an edge to edge dimension between 4 and 50 pixels and/or an area of at least 12 pixels and at most 2500 pixels, at the magnification used for the calibration images. In other embodiments, an edge to edge dimension between 10 and 40 pixels and/or an area of at least 75 pixels and at most 1600 pixels may be more advantageous.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4D show, with exaggerated distortion, typical image distortions for the calibration target of FIG. 2 when it is imaged near the four corners of the FOV;

DETAILED DESCRIPTION

Figure 1A:
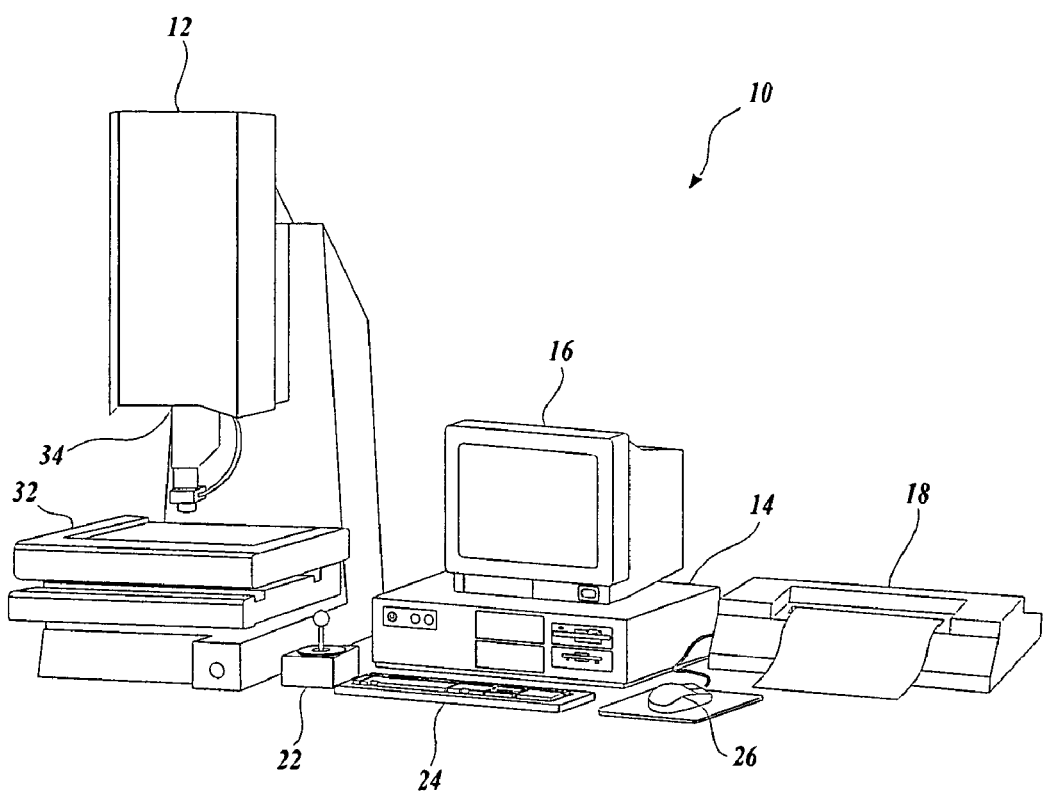
FIG. 1A is a diagram showing various typical components of a general-purpose machine vision inspection system.

FIG. 1A is a diagram of one exemplary machine vision inspection system 10 usable in accordance with the present invention. The machine vision inspection system 10 includes a vision measuring machine 12 that is connected to exchange data and control signals with a controlling computer system 14. The controlling computer system 14 is further connected to exchange data and control signals with a monitor 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses to provide various magnifications. The machine vision inspection system 10 is generally comparable to the QUICK VISION® series of vision systems and the QVPAK® software discussed above, and similar state-of-the-art commercially available precision machine vision inspection systems.

Figure 1B:
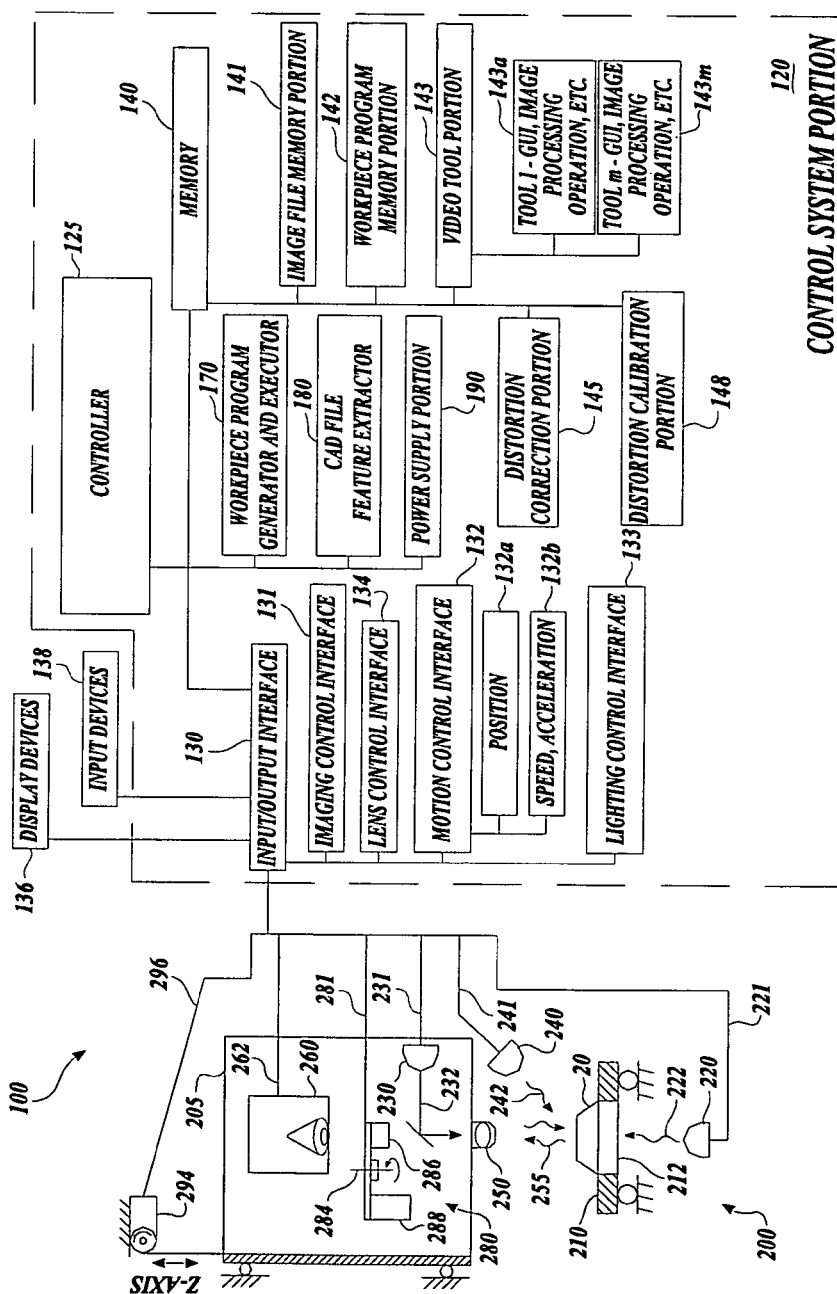
FIG. 1B is a diagram of a control system portion and a vision component portion of a machine vision inspection system.

FIG. 1B is a diagram of a control system portion 120 and a vision component portion 200 of a machine vision inspection system 100 usable in accordance with this invention. The control system portion 120 is utilized to control the vision component portion 200. The vision component portion 200 includes an optical assembly portion 205, light sources such as a stage light source 220, a coaxial light source 230 and a surface light source 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294.

A workpiece 20 that is to be imaged is placed on the workpiece stage 210. One or more of the light sources 220, 230 and 240 emits source light 222, 232, or 242, respectively, to illuminate the workpiece 20. The source light is reflected or transmitted by the workpiece as workpiece light 255, which passes through the objective lens 250 and the turret lens assembly 280 to the camera system 260. The image of the workpiece 20, captured by the camera system 260, is output on a signal line 262 to the control system portion 120.

The light sources 220, 230, and 240 are all connected to the control system portion 120 through signal lines or busses 221, 231 and 241, respectively. In various embodiments, the optical assembly portion 205 may include additional or different lenses, other optical elements such as apertures, beam-splitters and the like, such as may be needed for providing coaxial illumination, or other desirable machine vision inspection system features. When it is included in the machine vision inspection system 100, the turret lens assembly 280 may include at least a first turret lens position and lens 286 and a second turret lens position and lens 288. The control system portion 120 controls rotation of the turret lens assembly 280 about axis 284, between at least the first and second turret lens positions, through a signal line or bus 281.

The distance between the workpiece stage 210 and the optical assembly portion 205 can be adjusted to change the focus of the image of the workpiece 20. In various embodiments, the optical assembly portion 205 is movable in the vertical Z axis direction relative to the workpiece stage 210 using a controllable motor 294 that drives an actuator, a connecting cable, or the like. The term Z axis, as used herein, refers to the axis that is intended to be used for focusing the image. The controllable motor 294, when used, is connected to the input/output interface 130 via a signal line 296.

As shown in FIG. 1B, in various embodiments, the control system portion 120 includes a controller 125, an input/output interface 130, a memory 140, a workpiece program generator and executor 170, a CAD file feature extractor 180, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132A, and a speed/acceleration control element 132B. The lighting control interface 133 includes elements which may control the selection, power, on/off switch, and strobe pulse timing if applicable, for the various light sources of the machine vision inspection system 100.

The memory 140 includes an image file memory portion 141, a workpiece program memory portion 142 that may include one or more part programs, and a video tool portion 143. The video tool portion 143 includes tool portions 143a-143m, which determine the GUI, image processing operations, etc., for each of the corresponding tools. In various exemplary embodiments according to this invention, the memory 140 may also include a distortion correction portion 145 that may include a distortion calibration portion 148. As described in more detail below, the distortion calibration portion 148 analyzes multiple images of the same calibration target taken at multiple positions within an FOV to determine calibration data (or distortion parameters) that reduce the feature position distortions appearing in the multiple images. The distortion correction portion 145 then uses the distortion parameters found by the distortion calibration portion 148 to provide FOV distortion correction for measurement points within an image, and/or measurements, associated with subsequent workpiece inspection operations, and potentially for entire images, if desired.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs (or workpiece programs), to view the images captured by the camera system 260, and/or to directly control the vision system components portion 200.

With regard to the CAD file feature extractor 180, by using information such as a CAD file representing a workpiece, the locations of edges or boundaries may be predicted or determined manually, semi-automatically, or fully automatically, to facilitate workpiece part programming or navigating to a desired workpiece feature.

In various exemplary embodiments, a user may use the machine vision inspection system 100 to create workpiece image acquisition instructions for the workpiece 20, by explicitly coding the instructions using a workpiece programming language, or by generating the instructions by moving the machine vision inspection system 100 through an image acquisition training sequence such that the workpiece program instructions capture the training sequence. Once a set of workpiece image acquisition instructions are defined, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136. The control system portion 120 is further usable to recall stored workpiece inspection images, to inspect and analyze workpiece features in such workpiece inspection images, and to store and/or output the inspection results. These methods are typically embodied in various video tools included in the video tool portion 143 of the memory 140, such as the autofocus tool, edge/boundary detection tools, dimension measuring tools, coordinate matching tools, and the like. Some of these tools are routinely used in a variety of commercially available machine vision inspection systems, such as the QUICK VISION® series of vision systems and the associated QVPAK® software. After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140. The procedures outlined above may be used to create a program or routine that implements a distortion calibration method according to this invention, if desired.

Figure 2:
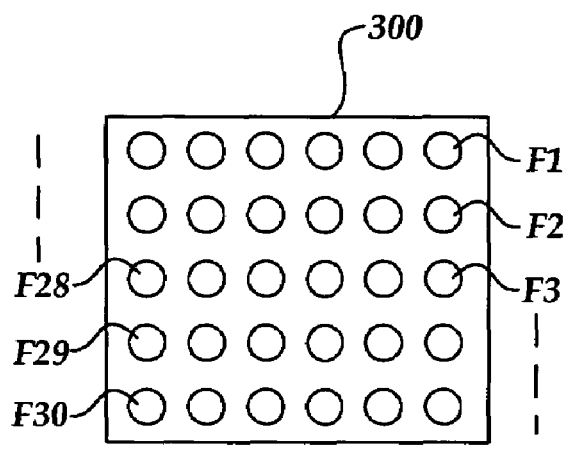
FIG. 2 shows a first embodiment of a calibration target including multiple features.
Figure 3:
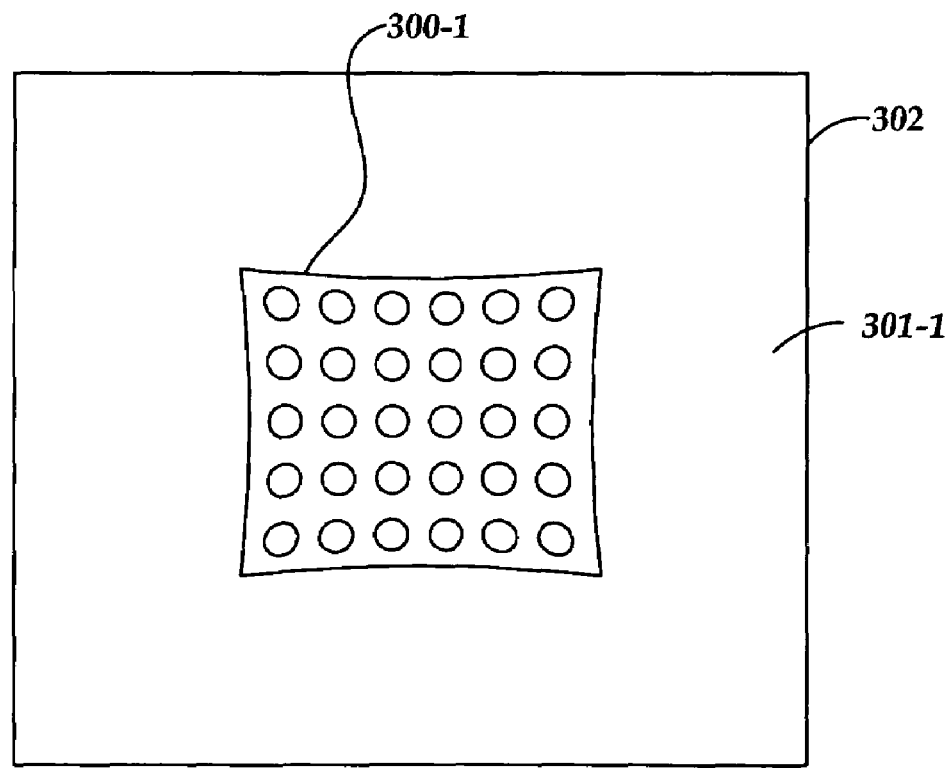
FIG. 3 shows, with exaggerated distortion, a typical image distortion for the calibration target of FIG. 2 when it is imaged near the center of a field of view (FOV)

FIGS. 2-4B illustrate one example of an FOV distortion that a system and method of the present invention are designed to correct. FIG. 2 illustrates one exemplary calibration target 300 (or a feature pattern included in a workpiece to be inspected), including a 2D pattern of features $F_n$, where n=1, 2, 3 . . . 30. The array type pattern shown is exemplary only, and not limiting. In various embodiments, a calibration target is imaged at a plurality of positions P in the FOV, and the images and related coordinate data are analyzed to calculate FOV distortion calibration data. Thereafter the calibration data may be used to correct FOV distortion errors that would otherwise be included in subsequent measurement operations. FIG. 3 shows an overall image 301-1 that coincides with the FOV 302, and a calibration target image 300-1 (P=a) that is a sub-image located within the overall image 301-1. According to a convention used herein, the nominal position P of the calibration target image 300-1 within the overall image 301-1 (or the FOV 302) is designated position "1" (P=1), and the suffix "-1" is added to the generic reference numbers 300, 301, etc., to indicate the particular instances of the corresponding elements associated with that calibration target position. As shown in FIG. 3, the position 1 is located approximately at the center of the FOV 302. The image 300-1 exhibits a pincushion type distortion (greatly exaggerated for illustration purposes). FIGS. 4A-4D illustrate four calibration target images 300-2 to 300-5 obtained with the same calibration target 300, positioned near the four corners of the FOV 302, respectively. The distortions shown in FIGS. 4A-4D are also greatly exaggerated for illustration purposes.

Generally, the FOV distortion may be due to lens field curvature, imperfections of the CCD, imperfect perpendicularity of the camera CCD to the optical axis of the vision system, and/or imperfect perpendicularity of the optical axis of the vision system to the workpiece stage. For the well made optical systems that are typically used in precision machine vision inspection systems, pincushion or barrel distortions, which may be characterized by a "radially symmetric" model, often predominate. Briefly, such distortions are one type of Seidel lens aberration (which generally includes spherical aberration, coma, astigmatism, curvature of field, distortion, and chromatic aberration). To provide a simple and clear outline of the present invention, correction of such radially symmetric distortions is emphasized in the examples herein. However, when a sufficiently comprehensive mathematical model of the optical system aberrations is used, the systems and methods according to this invention may be used to characterize or calibrate any type of aberration that is of practical concern. Thus, as used herein, unless otherwise indicated description or context, the term FOV distortion generally refers to image distortion that may be caused by a variety of optical system aberrations, either separately, or collectively.

Figure 5:
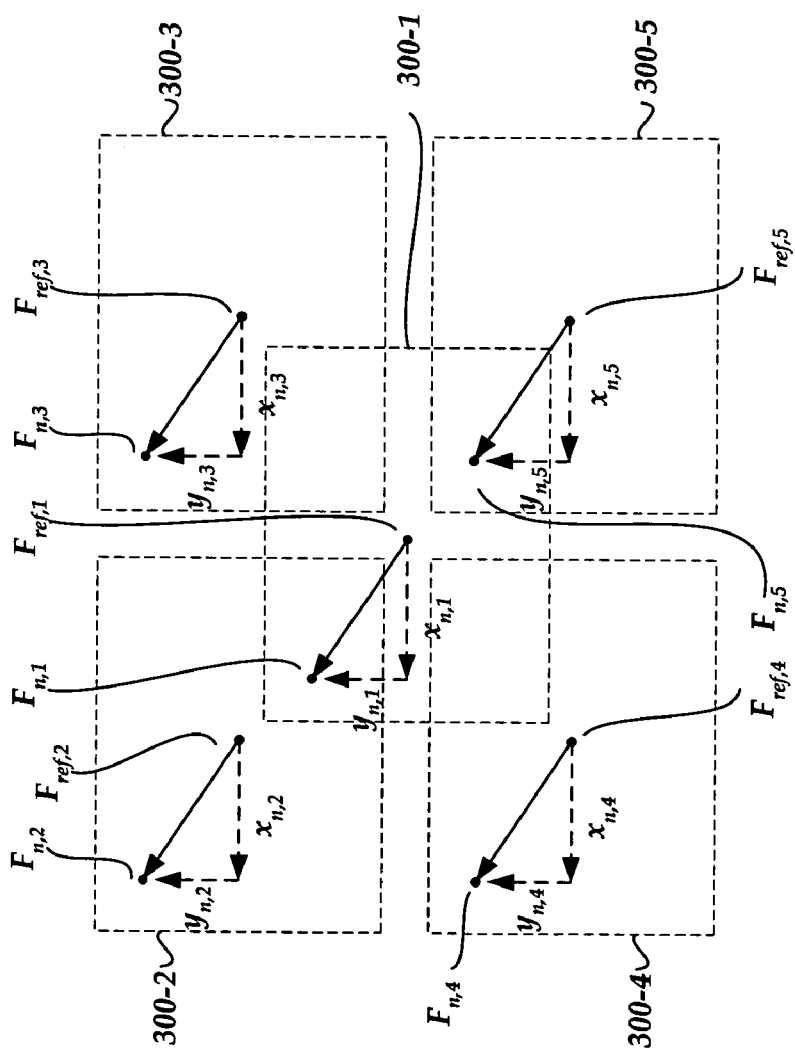
FIG. 5 is a diagram illustrating the position of a feature relative to a reference point within each of the five images of FIGS. 3 and 4A-4D.

FIG. 5 is a diagram illustrating the relative position of a generic calibration target feature $F_{n,P}$, where n is an identifier for the individual "$n^{th}$" feature on the calibration target, in various positions/images P (P=1, 2, 3, 4, or 5) in relation to a reference point $F_{ref,P}$, as indicated in each of the five images of FIGS. 3 and 4A-4D. If there is no distortion, then in each image P, the feature $F_{n,P}$ should always appear at the same location relative to the reference point $F_{ref,P}$. However, due to distortion, in various images the position of the feature $F_{n,P}$ relative to the reference point $F_{ref,P}$ will depend on where in the FOV the calibration target 300 is located when the image 300P is obtained. In FIG. 5, in the image 300-1 for example, the feature $F_{n,1}$ is located at $(x_{n,1}, y_{n,1})$ relative to the reference point $F_{ref,1}$, in the image 300-2 the feature $F_{n,2}$ is located at $(x_{n,2}, y_{n,2})$ relative to the reference point $F_{ref,2}$, and so on, where $(x_{n,1}, y_{n,1})$ will generally not be the same as $(x_{n,2}, y_{n,2})$ etc. These principles are described in greater detail below.

Figure 6:
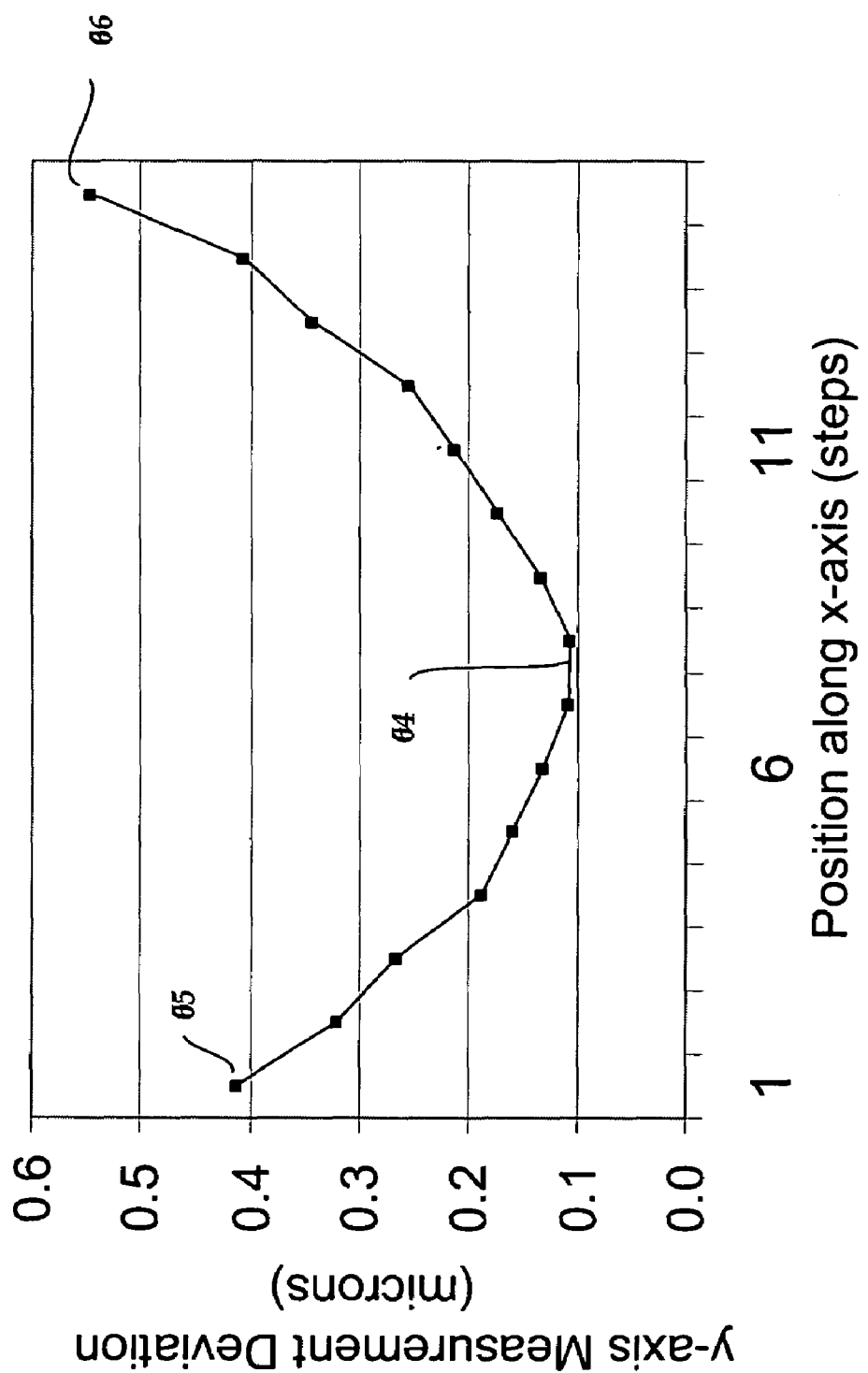
FIG. 6 is a graph showing the varying measurement results for the distance between an edge feature that is fixed relative to a reference point on a calibration target, as measured in various respective images when the calibration target is located at a series of respective positions along the x-axis within the FOV.

FIG. 6 is a graph illustrating the varying measurement results for the distance between an edge feature that is fixed relative to a reference point on a workpiece. The measurement is taken along the y-axis direction in various respective images when the workpiece is located at a series of respective positions approximately spanning the FOV along the x-axis direction. The y-axis position of the workpiece is nominally constant. In terms of the previous discussion, the measurement results are roughly analogous to variations in the $y_{n,P}$ coordinate of a feature $F_n$ relative to a reference point $F_{ref,P}$ at various positions P in the FOV. The measurement deviations plotted in FIG. 6 are relative to a calibrated distance of 200 microns on the workpiece. In this example, the measurement deviation is smaller when the feature is imaged near the center of the FOV (see point 604, about 0.1 um), and the deviation is greater toward the edges of the FOV (at point 605, about 0.4 um and at point 606, about 0.55 um). Thus, the measurement variation due to FOV distortion in this example is about 0.45 um, or roughly 0.23 pixels at 5× magnification. To reduce such measurement variations and improve accuracy it is desirable to correct for the FOV distortion so that a measurement result does not depend on the location of the measurement within the FOV.

The present invention provides a method for correcting the FOV distortion. In various exemplary embodiments, a series of "distorted" images are acquired with the same region of a calibration target imaged at different locations within an FOV, and the images are analyzed to determine calibration data for correcting the FOV distortion errors. The method may determine distortion parameters that correct the distortions in the analyzed images such that the calibration features in the images achieve a sufficient or optimum degree of congruence. The calibration data (or distortion parameters) may be determined for each optical configuration (e.g., lens combination, magnification, etc.) that is used by the machine vision inspection system. The calibration data can thereafter be used to correct measurement errors due to FOV distortion in subsequent inspection and measurement operations.

In various embodiments, the method may take advantage of the relatively precise operating and/or optical characteristics of the host machine vision inspection system in order to determine a selected set of distortion parameters with greater simplicity and accuracy. For example, for some models of machines of the type described with reference to FIGS. 1A and 1B, it may be judiciously determined that calibration target rotation is negligible as it is moved to various parts of the FOV, or it may be judiciously determined that optical aberrations other than radially symmetric aberrations are negligible. In such cases, by identifying calibration target rotation and/or additional aberrations as variables that may be eliminated or set to zero, the stability or reliability the mathematical models and/or methods used to determine the FOV distortion parameters may be increased. Also, mathematically viable solutions that are physically improbable may be prevented, thus increasing the accuracy of the FOV distortion correction. In various embodiments, such considerations may enhance the level of error detection and correction that is provided by this invention.

Another feature of the invention is that the distortion parameters may be determined in terms of the pixel coordinate system of the camera such that stage position measurement errors need not enter into the determination of the distortion parameters or the subsequent measurement corrections, for distances within the FOV.

Figure 7:
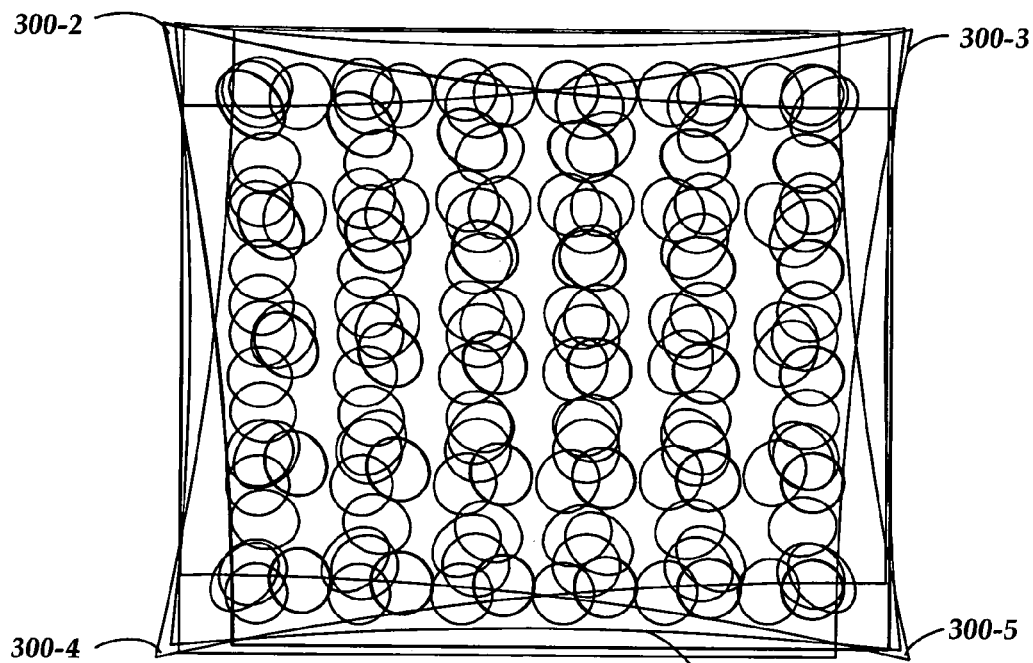
FIG. 7 shows, with exaggerated distortion, superimposed images of the same calibration target taken at different positions within the FOV, prior to the correction of the distortion in the images.
Figure 8:
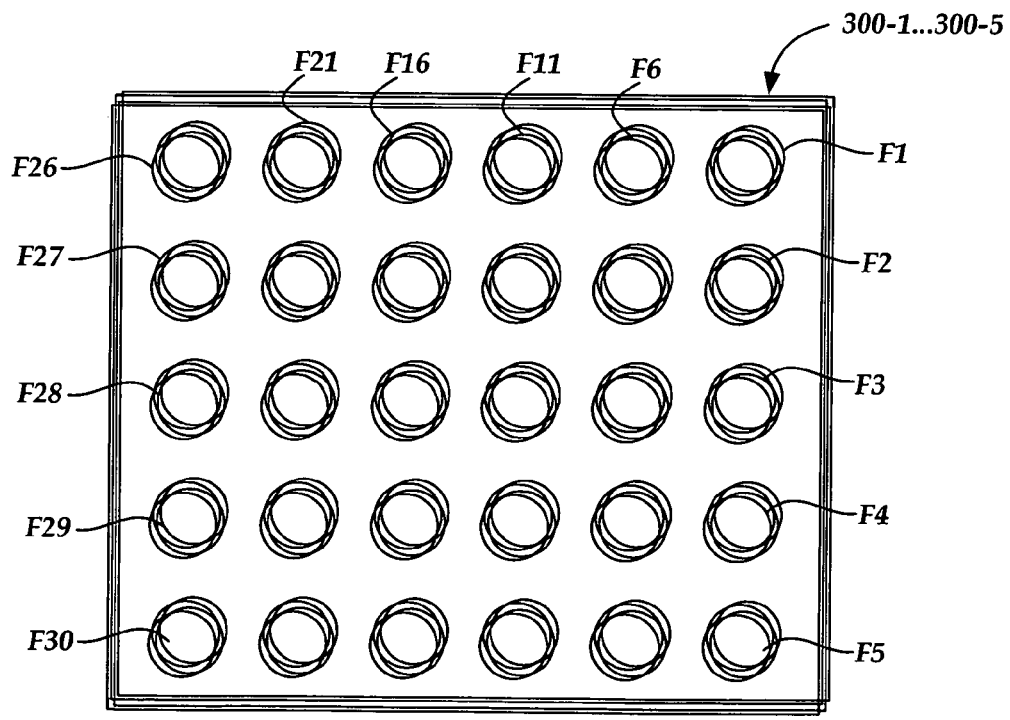
FIG. 8 shows, with exaggerated distortion and displacements, superimposed images of the same calibration target taken at different positions within the FOV, following the correction of distortion in the images, in accordance with this invention.

FIGS. 7 and 8 schematically illustrate the concept of analyzing multiple images of the same calibration target taken at different positions within an FOV to calculate distortion parameters that reduce or minimize the distortion of the calibration target feature locations in the multiple images. FIG. 7 shows, with exaggeration, the five distorted images 300-1 and 300-2-300-5 of the calibration target 300, taken at the locations shown in FIGS. 3 and 4A-4D, respectively, superimposed on each other. Each of the images includes the calibration target features F1 through F30, as previously described in FIG. 2. FIG. 8 shows the same five images after distortion correction operations according to the principles of this invention. In contrast to FIG. 7, the feature patterns in the five images are congruent with each other. They are illustrated with exaggerated translational offsets, to allow them to be distinguished from one another in the image.

Figure 9:
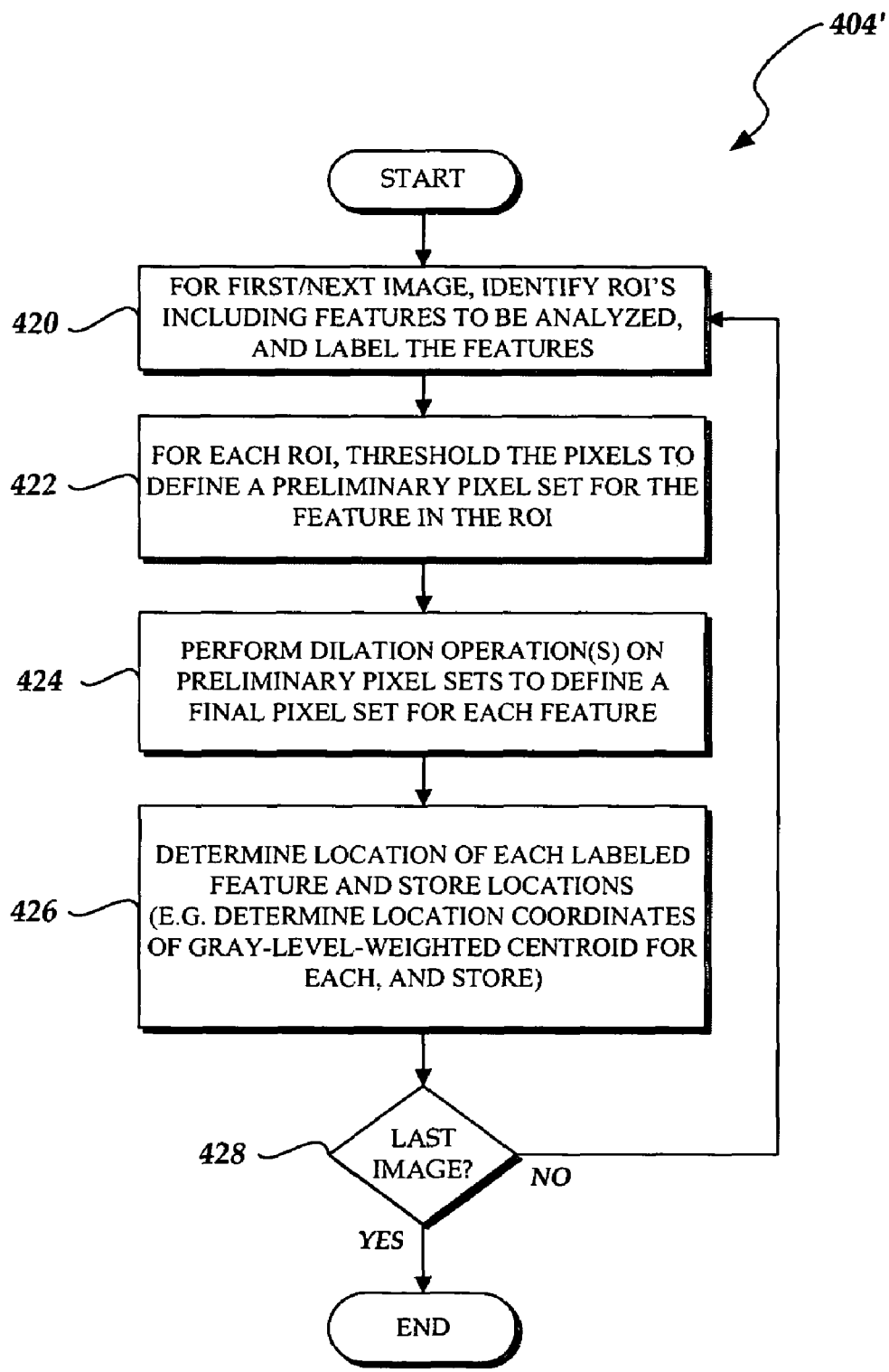
FIG. 9 is a flow chart illustrative of a routine for determining location coordinates for calibration target features included in each of a plurality of calibration images.

FIG. 9 is a flow chart 404' illustrative of one exemplary set of operations for determining the location coordinates of various calibration target features in an image. The location coordinates of the various features provide data needed for distortion calibration operations. At step 420, a current image is selected for analysis and regions of interest (ROIs) are defined that include the various selected features whose locations are to be determined. In the case of systems that include automated motion, and programmable image analysis, the calibration target position may be known based on setup operations and the motion control position coordinates corresponding to each image. The ROIs may then be automatically determined in each image based on the known nominal positions of their included features within the calibration target pattern. Each ROI and/or feature may be labeled or identified, accordingly. In the case of systems that do not include automated motion (requiring the calibration target to be moved by hand), an operator may, if necessary, examine each image to identify each feature, and to define appropriate ROIs. Since the various other operations described herein may be performed with reference to an FOV coordinate system, other steps may be performed in substantially the same manner regardless of whether automated motion and position measurement is available or not.

At step 422, for each ROI, a thresholding operation is applied to isolate a preliminary set of pixels belonging to each included feature. The calibration target may have high-contrast features to support reliable thresholding. At step 424, a dilation operation is performed on each preliminary set of feature pixels to provide an expanded final set of feature pixels that is certain to include all "feature boundary" pixels. At step 426, the location coordinates of each labeled feature in the image are determined based on its final pixel set, as described in greater detail below. Then the determined location coordinates of each labeled feature are stored. At decision step 428, if the current image is not the last image to be analyzed, then operation returns to step 420. If the current image is the last image, then the operations end.

In one exemplary embodiment, the final pixel set for a feature may be analyzed to determine the coordinates of the gray-level-weighted centroid of the pixel set, to high subpixel resolution (for example on the order of $1/100^{th}$ of a pixel). The centroid coordinates are taken as the feature coordinates. In one exemplary embodiment, the calibration target features may be solid, uniform, circular features.

In general, the shape of the features will be distorted (as well as their location). It can be shown that as the feature size is increased, a location error associated with a centroid operation (or many alternative location measures) will increase. To explain, hypothetically, if a circular feature were a point, its shape would be undistorted and its centroid would coincide with its "true center" at all locations in the FOV. However, a larger circular feature would, in general, have an asymmetrical distortion that depends on its location in the FOV. For an asymmetrical distortion, the centroid will be biased away from the location of the "true center" of the feature. The larger the feature in the FOV, the larger the magnitude of the bias will be. In various embodiments, it is advantageous to provide features that are small enough to avoid significant shape distortion, large enough to obtain ensure good measurement repeatability. In some embodiments a calibration target feature may have an edge to edge dimension between 4 and 50 pixels and/or an area of at least 12 pixels and at most 2500 pixels, at the magnification used for the calibration images. In other embodiments, an edge to edge dimension between 10 and 40 pixels and/or an area of at least 75 pixels and at most 1600 pixels may be more advantageous. Accordingly, in various embodiments, the calibration target includes a plurality of feature patterns at different scales, so that an accurate distortion calibration can be determined using a desired number of features having a desired size (in units of pixels) for various magnifications. It should be appreciated that the feature shape and location determining operations described above are illustrative only, and not limiting. Various alternative feature shapes (e.g., squares, crosses, rings, etc.) and location determining operations (e.g., ellipse or other shape fitting, Gaussian distribution fitting, binary centroid, detection/location of orthogonal edges and subsequent calculation of their crossing point or corner, etc.) may be used to obtain useful results.

Figure 10:
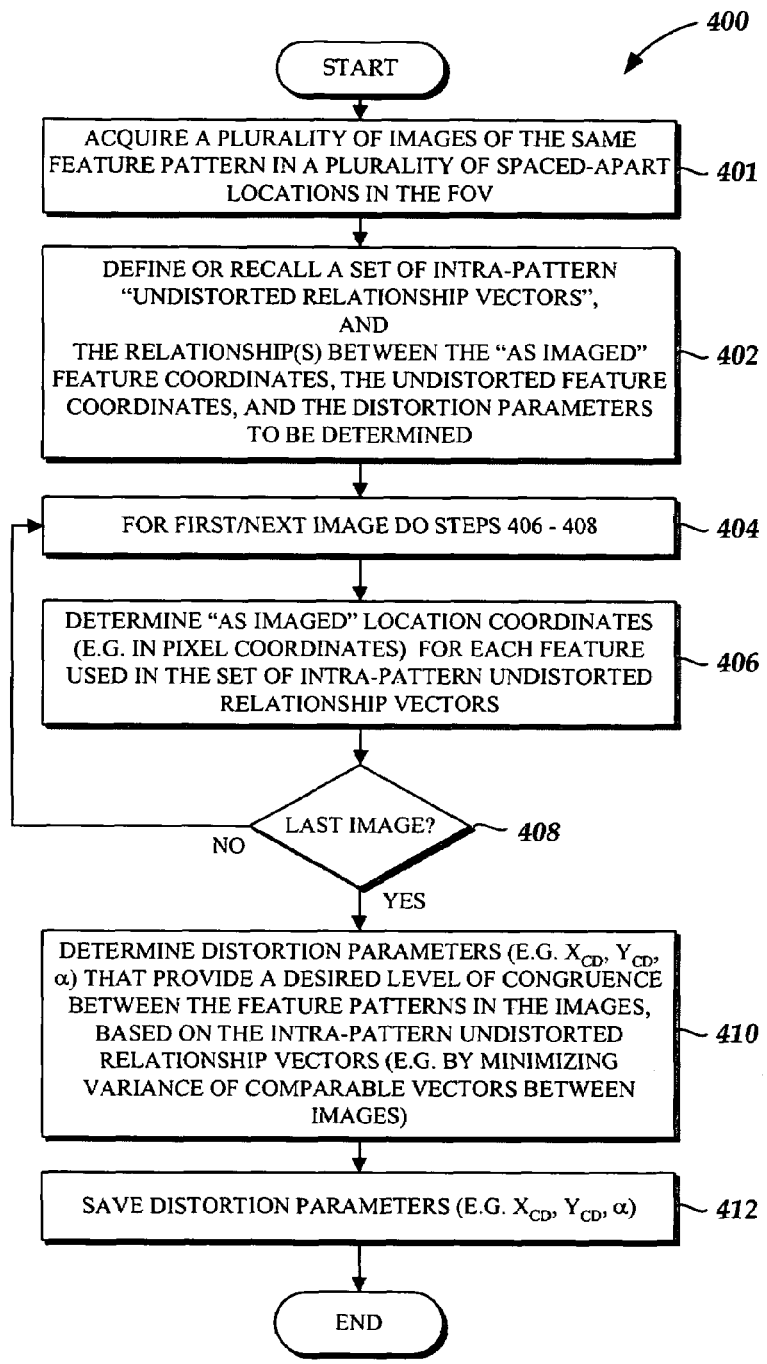
FIG. 10 is a flowchart illustrative of one exemplary routine for determining distortion calibration parameters in accordance with this invention.

FIG. 10 is a flow chart illustrative of a routine 400 for determining FOV distortion calibration or correction data (distortion parameters) in accordance with one exemplary embodiment of the invention. At step 401, a plurality of images of the calibration target pattern of features are acquired at spaced-apart locations in the FOV. For example, in one embodiment, although not a requirement, a translation and/or rotation of the calibration target pattern between first and second images may be configured such that at least some of the features of the calibration target pattern change their radial distance from the center of the FOV by at least 15% of a minimum dimension of the FOV. In another embodiment, a translation and/or rotation of the calibration target pattern between first and second images may change the radial distance of some features from the center of the FOV by at least 25% of a minimum dimension of the FOV.

In another embodiment, a greater number of images may be acquired. For example, referring to FIGS. 4A-4D, four images of the same calibration target 300 may be acquired in four quadrants of the FOV 302. The inventors have found that such arrangements, wherein at least two images of the same calibration target are taken at positions that are spaced relatively far apart from each other, may be advantageous for achieving high-accuracy distortion correction in the sub-micron range which is advantageous for high-precision microscopes and vision inspection systems. Closer spacings may be used, however, the calibration accuracy may suffer.

Next, at step 402, a set of intra-pattern "undistorted relationship vectors" (that is, the mathematical expressions for the vectors) are defined, determined, or recalled. In addition, the relationship(s) between the "as imaged" feature coordinates, the "undistorted" feature coordinates, and the distortion terms that are included in the mathematical model of the optical distortion, are defined, determined or recalled. In one exemplary embodiment described in greater detail below, a set of distortion parameters appropriate for correcting a radially symmetric distortion may consist of the coordinates $(X_{CD}, Y_{CD})$ of the center of optical distortion and a radial distortion coefficient $\alpha$. In other embodiments, additional or different distortion parameters may be determined. Various aspects of one exemplary type of intra-pattern undistorted relationship vector are described in greater detail below with reference to FIG. 11.

At step 404, an image is selected for operations 406-408. At step 406, for each feature used in the set of intra-pattern undistorted relationship vectors defined at step 402, its location coordinates (e.g., centroid coordinates) "as imaged" in the selected image are determined. It may be convenient for distortion correction if the coordinates are determined in "pixel coordinates". That is, the FOV is imaged by rows and columns of camera pixels that provide a useful coordinate system. Generally, the location coordinates may be determined with subpixel resolution, e.g. on the order of 1/50, or 1/100 of the pixel spacing. Various considerations related to determining feature location coordinates have been described previously, with reference to FIG. 9. At step 408, if the last image has not been analyzed, then operation returns to step 404, where analysis of the next image begins. If the last image has been analyzed, then operation continues to step 410.

At step 410, distortion parameters are determined that provide a desired or sufficient level of congruence between the feature patterns in the images, based on the intra-pattern undistorted relationship vectors (e.g. by minimizing the variance of comparable intra-pattern undistorted relationship vectors between images). Next, at step 412, the distortion parameters are saved for future use, and the routine ends. Various considerations and teachings related to the determination of distortion parameters at step 410 are described in greater detail below, with reference to FIG. 11, and Equations 1-14. Equations 7 and 10 are particularly relevant when the distortion parameters to be determined are the coordinates $(X_{CD}, Y_{CD})$ of the center of optical distortion, and the radial distortion coefficient $\alpha$.

In various exemplary embodiments of the invention, a routine generally described above in reference to FIG. 10 is performed so as to characterize the FOV distortion for each respective lens or lens combination (or magnification) used in a vision system. The respective stored calibration data (distortion parameters) are then recalled as needed for correcting various measurement values depending on their locations in FOV, when using that respective lens or lens combination (or magnification).

Figure 11:
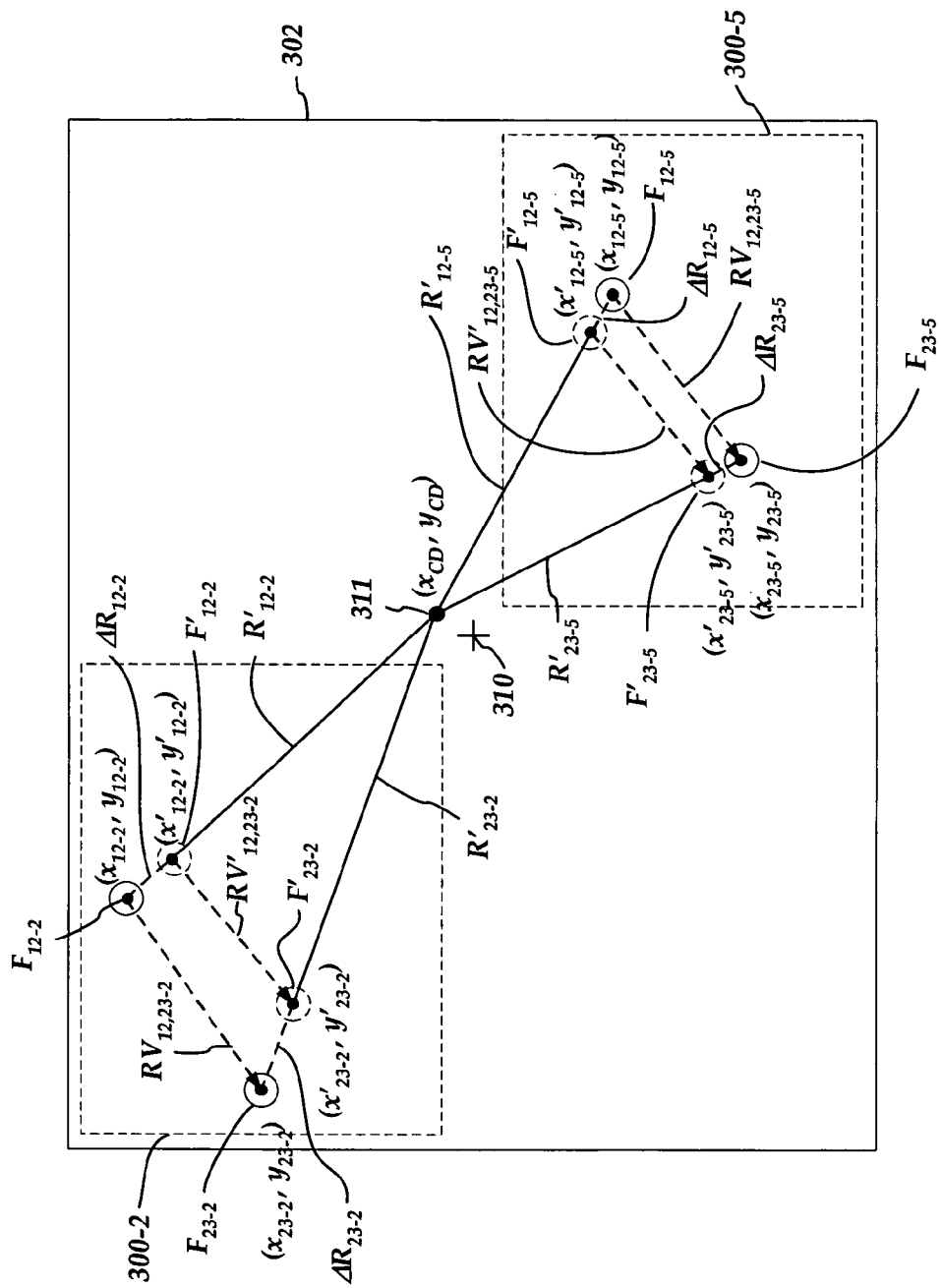
FIG. 11 is a diagram illustrative of various important terms, concepts, relationships and conventions used herein, including an illustration of exemplary intra-pattern undistorted relationship vectors.

Before describing various considerations related to determining a set of distortion parameters based on intra-pattern undistorted relationship vectors, various important terms, relationships and conventions used herein, will be clarified with reference to FIG. 11.

FIG. 11 is a diagram illustrative of various important terms, concepts, relationships and conventions used herein, including an illustration of exemplary intra-pattern undistorted relationship vectors. Calibration target images 300-2 and 300-5 are shown schematically in FIG. 11. Most calibration target features are omitted in the FIGURE, so that certain concepts may be emphasized and explained more clearly.

According to previously established conventions, the variable P is used to identify a particular calibration target image/location, and the variable n is used to identify a particular feature included in the calibration target pattern. The value of the variable P is generally the first element in a subscript, denoting the image/location referred to. One or more values of the variable n generally follow the variable P in a subscript, denoting the particular calibration target feature, or features, referred to.

FIG. 11 shows the calibration target images 300-2 (P=2) and 300-5 (P=5), at their respective positions in the FOV 302. Features $F_{12}$ (n=12) and $F_{23}$ (n=23) of the calibration target pattern are illustrated as $F_{12,2}$, $F_{23,2}$, and $F_{12,5}$, $F_{23,5}$, at their apparent positions in the images 300-2 and 300-5, respectively. The FOV coordinates of $F_{12,2}$ are $(x_{12,2}, y_{12,2})$, relative to the FOV 302 (in a "camera pixel coordinate system", for example). Similarly, the FOV coordinates of $F_{12,5}$ are $(x_{12,5}, y_{12,5})$, the FOV coordinates of $F_{23,2}$ are $(x_{23,2}, y_{23,2})$, and the FOV coordinates of $F_{23,5}$ are $(x_{23,5}, y_{23,5})$. The convention here is that coordinates without superscripts refer to "as imaged" feature FOV coordinates, including the effects of distortion. Coordinates with superscripts refer to the corrected or undistorted FOV coordinates of a feature.

In FIG. 11, an undistorted feature representation $F'_{12,2}$, having FOV coordinates $(x'_{12,2}, y'_{12,2})$, represents the undistorted position of $F_{12,2}$. The undistorted feature representations $F'_{23,2}$, and $F'_{12,5}$, and $F'_{23,5}$, are analogous to the undistorted feature representation $F'_{12,2}$, and have analogous coordinates. An undistorted relationship vector $RV'_{12/23,2}$ connects the undistorted feature representation $F'_{12,2}$ to the undistorted feature representation $F'_{23,2}$, and an undistorted relationship vector $RV'_{12/23,5}$ connects the undistorted feature representation $F'_{12,5}$ to the undistorted feature representation $F'_{23,5}$. It will be appreciated that since the relationship vectors $RV'_{12/23,2}$ and $RV'_{12/23,5}$ actually connect the same features on the calibration target, in undistorted images they should be equal. More generally, the entire undistorted calibration target feature pattern should be congruent in various regions of various undistorted images. Therefore, in general, respective undistorted relationship vectors corresponding to the same calibration target features in respective images should be equal.

In various exemplary embodiments according to this invention, a set of distortion parameters is determined that minimizes the variation between the undistorted relationship vectors in a plurality of calibration images. A set of several undistorted relationship vectors may provide the basis for determining the distortion parameters. For example, a number of undistorted relationship vectors may equal or exceed the number of features in a calibration target pattern. In various embodiments, it may be advantageous to define at least 5 and at most 80 undistorted relationship vectors. In other embodiments, it may be more advantageous to define at least 20 and at most 60 undistorted relationship vectors. However, the number of undistorted relationship vectors may be greater or lesser in various embodiments depending on the size and pixel resolution of the FOV, the desired distortion calibration accuracy, and the like. In various embodiments, an undistorted relationship vector may be based on two undistorted feature locations, two derived undistorted feature locations, or a combination of actual and derived undistorted feature locations. In various embodiments, useful derived undistorted feature locations may include an average of several undistorted feature locations, or the like.

It is useful to define a set of N undistorted relationship vectors $RV'_j$ (where j ranges from 1 to N). In this example, each respective undistorted relationship vector connects two respective features, as illustrated by the undistorted relationship vector $RV'_{12/23,2}$, for example. Using the previously defined image/position variable P as a subscript, a set of N undistorted relationship vectors for each of M calibration images/positions (where P ranges from 1 to M) may be represented as an N×M matrix $\Omega$ having elements $RV'_{(j,P)}$. As shown in FIG. 11, the undistorted relationship vector $RV'_{12/23,2}$ has x and y components as follows:

$$RV'_{12/23,2} = ((x'_{23,2} - x'_{12,2}), (y'_{23,2} - y'_{12,2}))$$

A general undistorted relationship vector $RV'_{(j,P)}$ has x and y components as follows:

$$RV'_{j,P} = ((x'_{n2_j,P} - x'_{n1_j,P}), (y'_{n2_j,P} - y'_{n1_j,P})) \quad \text{(Eq. 1)}$$

where $n2_j$ and $n1_j$ denote the particular values of the variable n that identify the particular first and second features that are used to determine the jth undistorted relationship vector in each calibration image.

A desirable set of distortion parameters should minimize the variation between the vectors $RV'_{(j,P)}$ along each row j of the matrix (each undistorted relationship vector element in a row corresponding to the same features on the calibration target). To determine a set of distortion parameters according to this principle, relationships must be defined between the "as imaged" features coordinates, the undistorted image coordinates, and the distortion parameters to be determined. One exemplary set of such relationships is developed here with reference to FIG. 11.

FIG. 11 shows a center of optical distortion 311. A general center of optical distortion has FOV coordinates ($x_{CD}$, $y_{CD}$) that are the same in both the distorted and undistorted cases, by definition. The coordinates of a center of distortion are not known a priori. Rather, they are distortion parameters to be determined, as described below. FIG. 11 shows the undistorted feature representation $R'_{12,2}$ connected to the center of optical distortion 311 by an undistorted radius vector $R'_{12,2}$. The undistorted radius vectors $R'_{23,2}$, $R'_{12,5}$, and $R'_{23,5}$ are analogous. A general undistorted radius vector $R'_{n,P}$ has x and y components as follows:

$$R'_{n,P} = ((x'_{n,P} - x_{CD}), (y'_{n,P} - y_{CD})) \quad \text{(Eq. 2)}$$

Distortion vectors $\Delta R_{12,2}$ and $\Delta R_{12,5}$ are shown in FIG. 11, extending between the undistorted and distorted FOV coordinates of $F_{12,2}$ and $F_{12,5}$, respectively. A general distortion vector $\Delta R_{n,P}$ has x and y components as follows:

$$\Delta R_{n,P} = (\Delta x_{n,P}, \Delta y_{n,P}) = ((x_{n,P} - x'_{n,P}), (y_{n,P} - y'_{n,P})) \quad \text{(Eq. 3)}$$

Generally, the length and direction of a distortion vector $\Delta R_{n,P}$ are not known a priori, but they correspond to an assumed distortion model. Thus, they may eventually be estimated based on a set distortion parameters determined according to this invention. For purposes of illustration, a simple, radially symmetric distortion model is assumed here, such that the magnitude of the distortion of a feature location is proportional to the cube of the length of its undistorted radius vector, and the distortion direction is parallel to its undistorted radius vector. That is:

$$|\Delta R_{n,P}| = \alpha |R'_{n,P}|^3 \quad \text{(Eq. 4)}$$

and $$\Delta x_{n,P} = \alpha |R'_{n,P}|^3 \frac{(x'_{n,P} - x_{CD})}{|R'_{n,P}|} \quad \text{(Eq. 5)}$$
$$= \alpha[(x'_{n,P} - x_{CD})^2 + (y'_{n,P} - y_{CD})^2](x'_{n,P} - x_{CD})$$
$$\Delta y_{n,P} = \alpha |R'_{n,P}|^3 \frac{(y'_{n,P} - y_{CD})}{|R'_{n,P}|}$$
$$= \alpha[(x'_{n,P} - x_{CD})^2 + (y'_{n,P} - y_{CD})^2](y'_{n,P} - y_{CD})$$

The distortion parameter $\alpha$ may be referred to as the radial distortion coefficient, and is positive for pincushion distortion and negative for barrel distortion.

By observation, in FIG. 11:

$$x_{n,P} - x_{CD} = x'_{n,P} + \Delta x_{n,P} - x_{CD}$$
$$y_{n,P} - y_{CD} = y'_{n,P} + \Delta y_{n,P} - y_{CD} \quad \text{(Eq. 6)}$$

Substituting from Eq. 5 into Eq. 6:

$$x_{n,P} - x_{CD} = (x'_{n,P} - x_{CD})[(1 - \alpha)[(x'_{n,P} - x_{CD})^2 + (y'_{n,P} - y_{CD})^2]]$$

$$y_{n,P} - y_{CD} = (y'_{n,P} - y_{CD})[(1 - \alpha)[(x'_{n,P} - x_{CD})^2 + (y'_{n,P} - y_{CD})^2]] \quad \text{(Eq. 7)}$$

Eq. 7 provides the required relationships between the "as imaged" feature coordinates $x_{n,P}$ and $y_{n,P}$, the undistorted feature coordinates $x'_{n,P}$ and $y'_{n,P}$, and the distortion parameters $\alpha$, $x_{CD}$ and $y_{CD}$ that characterize the simple radially symmetric distortion model assumed for this example.

As previously indicated, a set of N undistorted relationship vectors $RV'_j$ (where j ranges from 1 to N) determined in each of M calibration images/positions (where P ranges from 1 to M) may be represented as an N×M matrix $\Omega$ having elements $RV'_{(j,P)}$. A desirable set of distortion parameters should minimize the variation between the vectors $RV'_{(j,P)}$ along each row j of the matrix (each element in a row corresponding to the same features on the calibration target). The averages the x-components and the y-components, of an undistorted relationship vector $RV'_j$ over all the image/positions P (along a row of the matrix $\Omega$ are, respectively:

$$\overline{RV'_{xj}} = \frac{1}{M} \sum_{P=1}^{M} \left( x'_{n2_j,P} - x'_{n1_j,P} \right) \quad \text{(Eq. 8)}$$

$$\overline{RV'_{yj}} = \frac{1}{M} \sum_{P=1}^{M} \left( y'_{n2_j,P} - y'_{n1_j,P} \right)$$

The corresponding variances of an undistorted relationship vector $RV'_j$ over all the image/positions P along a row are, respectively:

$$\sigma_j^2(RV'_{xj}) = \frac{1}{M-1} \sum_{P=1}^{M} \left( (x'_{n2_j,P} - x'_{n1_j,P}) - \overline{RV'_{xj}} \right)^2 \quad \text{(Eq. 9)}$$

$$\sigma_j^2(RV'_{yj}) = \frac{1}{M-1} \sum_{P=1}^{M} \left( (y'_{n2_j,P} - y'_{n1_j,P}) - \overline{RV'_{yj}} \right)^2$$

According to one exemplary method for determining the distortion parameters, the distortion parameters are chosen to approximately minimize the variances shown in Eq. 9, for all undistorted relationship vectors j. In this example, this means the previously described distortion parameters ($\alpha$, $x_{CD}$, $y_{CD}$) are chosen to minimize the following function:

$$F(\alpha, x_{CD}, y_{CD}, x_{j,P}, y_{j,P},) = \frac{1}{N} \sum_{j=1}^{N} [\sigma_j^2(RV'_{xj}) + \sigma_j^2(RV'_{yj})] \quad \text{(Eq. 10)}$$

subject to the conditions of Equation 7.

Such function minimizations may be performed by a variety of general purpose minimization or optimization routines or functions included in various commercially available software packages, for example by using the function *fmincon*( ), which is part of the MATLAB software package available from The MathWorks, Inc., Natick, Md., US.

As previously indicated, in various embodiments an undistorted relationship vector may be based on a combination of actual and derived feature locations. In one exemplary embodiment an average location of all features of a calibration target pattern is used as a derived feature location, and included in all undistorted relationship vectors, as follows. With reference to Eq. 5, the components of an average distortion vector for all features n in an image P may be defined as:

$$\overline{\Delta x_{n,P}} = \frac{1}{n_{max}} \sum_{n=1}^{n_{max}} (\Delta x_{n,P}) \quad \overline{\Delta y_{n,P}} = \frac{1}{n_{max}} \sum_{n=1}^{n_{max}} (\Delta y_{n,P}) \quad \text{(Eq. 11)}$$

The components of an average "as imaged" radius vector for all features n in an image P may be defined as:

$$\overline{x_{n,P}} = \frac{1}{n_{max}} \sum_{n=1}^{n_{max}} (x_{n,P}) \quad \overline{y_{n,P}} = \frac{1}{n_{max}} \sum_{n=1}^{n_{max}} (y_{n,P}) \quad \text{(Eq. 12)}$$

Then, with reference to Eq. 6, 11 and 12, the components of an average undistorted radius vector for all features n in an image P may be defined as:

$$\overline{x'_{n,P}} = \frac{1}{n_{max}} \sum_{n=1}^{n_{max}} (\overline{x_{n,P}} - \overline{\Delta x_{n,P}}) \quad \text{(Eq. 13)}$$

$$\overline{y'_{n,P}} = \frac{1}{n_{max}} \sum_{n=1}^{n_{max}} (\overline{y_{n,P}} - \overline{\Delta x_{n,P}})$$

By substituting into Eq. 8, an exemplary set of undistorted relationship vectors may be expressed as:

$$\overline{RV'_{xj}} = \frac{1}{M} \sum_{P=1}^{M} (x'_{n2_j,P} - \overline{x'_{n,P}}) \quad \text{(Eq. 14)}$$

$$\overline{RV'_{yj}} = \frac{1}{M} \sum_{P=1}^{M} (y'_{n2_j,P} - \overline{y'_{n,P}})$$

and the associated distortion parameters may then be determined as outlined above.

It should be appreciated that the mathematical relationships and solution techniques described above are just one exemplary method of determining distortion parameters based on a set of calibration images provided according to this invention. More generally, it should be appreciated that when a plurality of respective calibration images are provided, wherein the identical pattern of features is presented at a plurality of respective locations relative to the FOV, then, necessarily, using an FOV coordinate system, one must be able to transform the pattern of features in a first one of the images and the pattern of features in a second one of the images, into nominally identical forms by using an accurate set of distortion parameters. Conversely, one must be able to define an accurate set of distortion parameters by adjusting their values in a transform, such that the outcome of the transform produces congruent, or approximately congruent, patterns of features.

Regarding the identical forms mentioned above, it will be appreciated that identical forms may be obtained by transforming the pattern of features as it appears in the first image into the pattern of features as it appears in the second image, or the patterns of features in both images may be transformed into the same intermediate form, for example, the undistorted form represented by "undistorted feature representations" described above.

Alternatively, the pattern of features may be represented in a derived or abstract form, for example, as a set of "undistorted relationship vectors" of any of the forms described or implied herein, or in any other tractable form. In any case, best-fit, optimized and/or accurate distortion parameters will allow one to transform any tractable representation of a the pattern of features in one image into nominally the same form as a similar representation of the pattern of features in another image. Best-fit, optimized and/or accurate distortion parameters may be determined by any now-known or later developed mathematical technique, optimization, fitting, or trial and error procedure, or the like, such that this condition is satisfied.

Furthermore, rather than transforming representations of the pattern of features directly, a set of accurate distortion parameters may determined such that they allow a representation of the differences between any tractable representation of the pattern of features in the various images to be nominally transformed to "zero", or minimized. The process outlined above that minimizes the expression shown in Eq. 10, is just one embodiment of this technique.

Various alternatives outlined above may be generalized as follows. A set of distortion parameters may generally be determined based on the as-imaged positions of the features of the calibration target pattern in the plurality of images, in conjunction with at least one mathematical relationship that is consistent with at least one member of the group of facts consisting of:

a) the fact that in the absence of the distortion in the field of view, in each of the plurality of images the calibration target pattern would be congruent, and b) an accurate set of distortion parameters can be identified based on the fact that when they are applied to distortion-correct the positions of the same features in each of the plurality of calibration images, an intra-pattern relationship between those distortion-corrected features will nominally be the same for each of the plurality of images.

Various alternatives outlined above may also be characterized as determining the set of distortion parameters based on an expression that depends on a set of differences that depend on the as-imaged positions of at least some of the features of the calibration target pattern in a plurality of calibration images, and on the values of the distortion parameters. In various embodiments outlined above, each such respective difference may depend on at least two respective components, wherein a first one of the respective components depends on the as-imaged positions of at least two respective features included in one of the plurality of calibration images, and a second one of the respective components depends on the as-imaged positions of the same two respective features included in another of the plurality of calibration images. In many embodiments, the first component may individually depend on the values of the distortion parameters and the second component may individually depend on the values of the distortion parameters.

It should also be appreciated that it is also possible to transform images of the pattern of features into one another according to the foregoing discussion, in the case that the pattern is rotated by a respective amount in the image plane, in each respective image. In such a case, feature locations in each respective image can be used to determine respective amount of rotation in each image, and well known rotational transformations may be incorporated into the previously described techniques. In various embodiments that include such a rotational degree of freedom in the imaging plane, it may be convenient to define one or more constraints or relationships in a scalar form, rather than a vector form, in order to simplify determination of the distortion parameters.

According to the foregoing discussion, it will be appreciated that in various embodiments, a plurality of calibration images may be provided by positioning a distortion calibration target at a plurality of angles in the FOV or a plurality of locations in the FOV, or both. As just one example, a calibration target pattern may approximately fill a quadrant of the FOV at a first angle or orientation in a first image, and be rotated 180 degrees in the same quadrant to provide a second image. Thus, features and feature relationships that were at a large radius in the first image will be at a small radius in the second image, and therefore the differences between the distorted images will allow the distortion parameters to be determined. It should be noted that in the case of radial distortion, to rotate a calibration target around the center of the FOV (which is generally proximate to the center of distortion) will generally cause the calibrations target pattern to have approximately the same distortion in each image, making accurate determination of the distortion parameters difficult. Therefore, if rotation is used as the sole means of presenting the calibration target differently in the different calibration images, then it is generally advantageous to locate the rotation axis as far as possible from the center of the FOV (or particularly the center of distortion).

In one embodiment, a rotation and/or translation of the calibration target pattern between images may be configured such that at least some of the features of the calibration target pattern change their radial distance from the center of the FOV by at least 15% of a minimum dimension of the FOV. In another embodiment, a rotation and/or translation of the calibration target pattern between images may change the radial distance of some features from the center of the FOV by at least 25% of a minimum dimension of the FOV.

Figure 12:
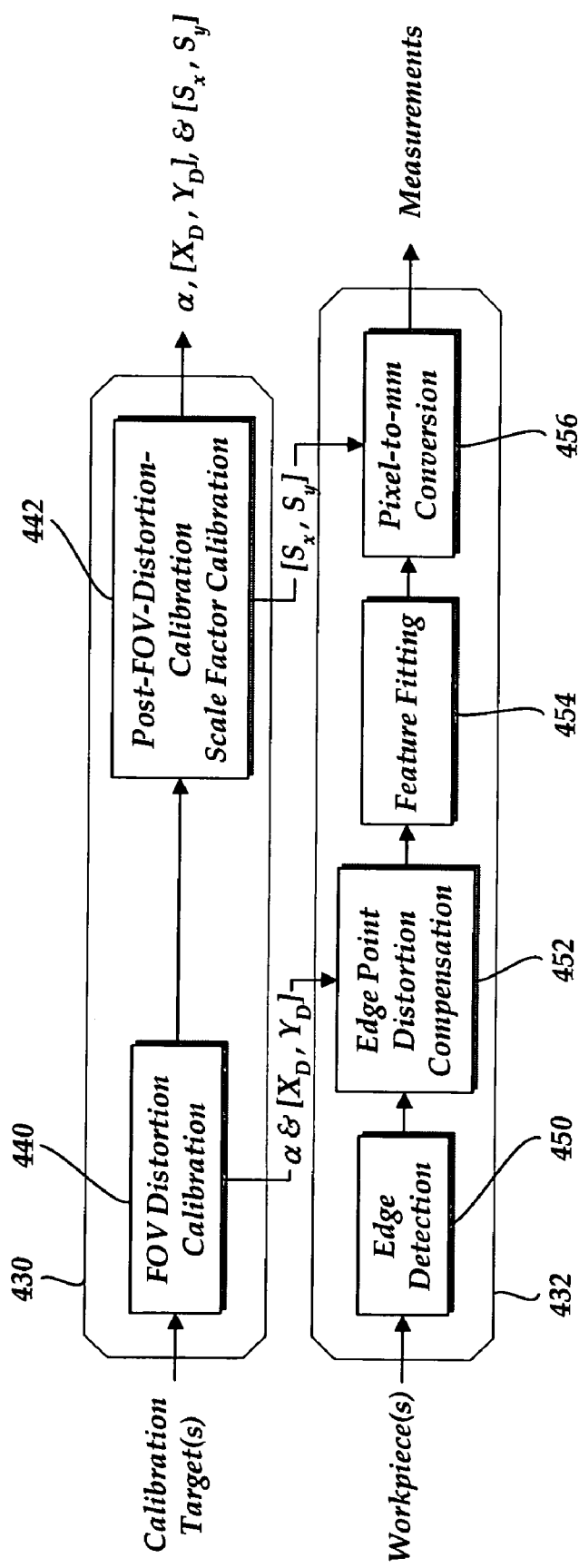
FIG. 12 is a diagram illustrating an overall scheme for implementing distortion calibration and correction in accordance with one embodiment of this invention.

FIG. 12 is a diagram illustrating one example implementing a distortion characterization/calibration process 430 and a measurement compensation/correction process 432, in accordance with of this invention. Both processes may be performed using the vision system 100.

The terms characterization and calibration are generally used interchangeably herein. The terms compensation and correction are likewise used interchangeably. In the characterization/calibration process 430, one or more calibration targets are received, and analyzed in an FOV distortion calibration process 440. The FOV distortion calibration process 440 generally corresponds to the routine described above in reference to FIG. 10, wherein the calibration target (300) is imaged at different locations within the FOV and analyzed to find distortion parameters that will minimize the differences between measurements of the same feature relationships at the different locations. The distortion parameters, for example, $\alpha$ and $(x_{CD}, y_{CD})$ are then stored (see step 412 in FIG. 10). The FOV distortion calibration process 440 may be executed by the distortion calibration portion 148 in the control system portion 120 of the vision system 100 (FIG. 1B).

In the compensation/correction process 432, workpieces to be inspected or measured are received by the vision system 100. In one exemplary operation, an edge detection process 450 is performed to find one or more edge points in an image of a workpiece. Any suitable edge-detection video tool (see 143 in FIG. 1B) commonly included in a vision system may be used to carry out the process. Next, an edge point distortion compensation process 452 is performed for each edge point determined in the workpiece image. For example, the distortion parameters $(\alpha, x_{CD}, y_{CD})$ found in one embodiment of the FOV distortion calibration process 440 may be used to find the undistorted coordinates of the edge points. Equation (7), previously described with reference to the coordinates of a calibration target feature, can be solved for the undistorted coordinates of any desired image pixel or analyzed edge point or the like, given its "as imaged" FOV coordinates (which may have sub-pixel resolution) and values for the distortion parameters $(\alpha, x_{CD}, y_{CD})$. In general, inspection and/or measuring throughput will be increased when distortion correction (compensation) is applied only to those image pixels and/or edge points, or the like, that are essential to a given measurement or inspection operation. However, distortion correction may be applied to any image feature or measurement point, if desired. The FOV compensation process 452 may be executed by the distortion correction portion 145 in the control system portion 120 of the vision system 100 (FIG. 1B).

The distortion-corrected edge point coordinates are then sent to a feature fitting process 454, which may be included in the edge-detection video tool, where the distortion-corrected workpiece feature location and/or shape is determined (e.g. for lines, circles, etc.). Finally, the feature measurement value(s), which may be in a pixel coordinate system, may undergo a pixel-to-mm conversion process 456 where the distortion-corrected FOV pixel coordinate system values are converted to standard measurement units, and may be combined with motion control (stage) coordinates to determine an overall distortion-corrected feature location in the machine coordinate system, or part coordinate system, if required.

The pixel-to-mm conversion process 456 is a known procedure. Scale factors $(S_x, S_y)$ in units of mm/pixel, may be used. The scale factor calibration process 442 may be a known type of scale factor calibration process, using a known type of scale factor calibration target having precisely known dimensions. It is advantageous if the scale factors ($S_x$, $S_y$), are determined in a "post-FOV-distortion-calibration" scale factor calibration process 442, performed after the FOV distortion calibration process 440. In particular, measurement points determined from images of a scale factor calibration target can then be distortion-corrected as outlined above with reference to elements 450, 452, and 454, for example. It will be appreciated that in the absence of such distortion correction, the pixel dimensions of calibration dimensions on the scale factor calibration target will be distorted, and dependent on the feature locations in the FOV. Thus, a set of scale factors ($S_x$, $S_y$), which are generally applied throughout the FOV, may include errors. However, if the distortion-correction process is applied to the scale factor calibration target measurement points prior to scale factor calibration, then a distortion-corrected pixel measurement will be compared to the known calibration target dimensions, and the resulting scale factors ($S_x$, $S_y$) will not be dependent on the target location in the FOV. A more accurate, globally applicable, result will be obtained. Subsequently, the scale factors ($S_x$, $S_y$) will provide accurate pixel-to-mm conversion for distortion-corrected location or distance measurement, throughout the FOV.

The methods and processes disclosed herein have generally been described in the context of an automated precision machine vision inspection system that includes an XY stage that provides rectilinear motion. However, in general, this invention may be applied to any microscope system, high-magnification imaging system, or the like that includes digital imaging and image processing capability, despite the lack an XY stage and/or other features of the vision system 100. For example, as previously indicated, in such systems an operator may relocate the calibration target pattern in the FOV for various calibration images, by hand and identify features, and their locations in the FOV, with the aid of simple image processing software routines or tools. Subsequent analysis to determine the distortion parameters and/or correct positions and measurements in the FOV may be performed as previously described.

Figure 13:
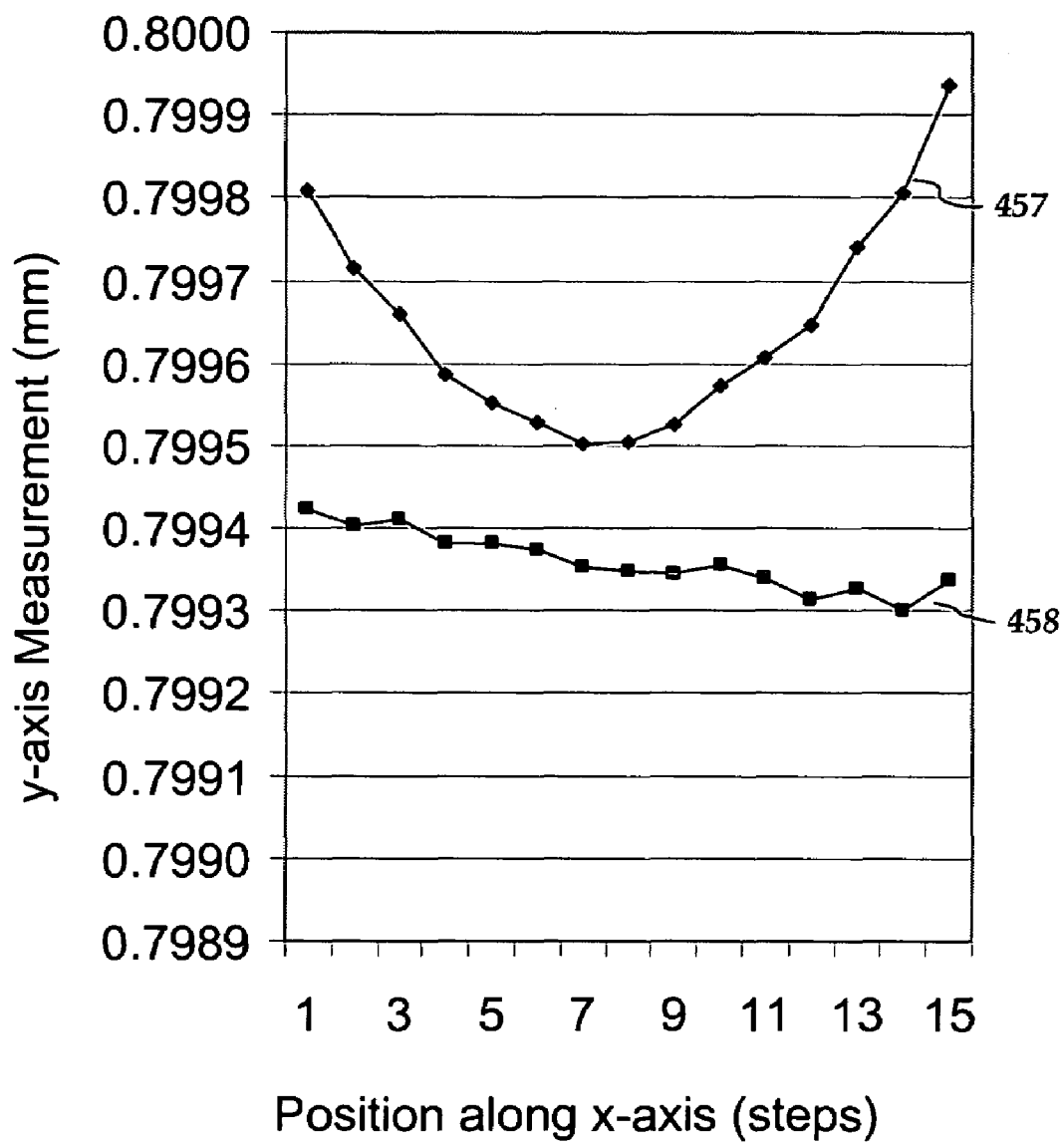
FIG. 13 is a graph showing the results of measurements of a feature relative to a reference point at different positions within the FOV, before and after distortion correction in accordance with one embodiment of this invention.

FIG. 13 is a graph similar to that shown in FIG. 6, contrasting uncorrected and distortion-corrected results for the distance between an edge feature that is fixed relative to a reference point on a workpiece. For the distortion-corrected results 458 shown in FIG. 13, the previously described distortion parameters ($\alpha$, $x_{CD}$, $y_{CD}$) were determined and applied, approximately as previously described. The experimental procedure is substantially identical to that used for FIG. 6, and therefore is not described in detail here. However, rather than plotting a measurement deviation from a known dimension along the vertical axis, in FIG. 13 measurement values are plotted. For the uncorrected measurement results 457, the measurement deviation across the FOV (steps 1-15) is approximately 0.45 microns. For the distortion-corrected measurement results 458, the measurement deviation across the FOV (steps 1-15) is approximately 0.12, which is a significant improvement for a precision machine vision inspection system. In this example, the distortion-corrected measurement results 458 were not adjusted for the scale factor change induced by the distortion correction process.

Figure 14:
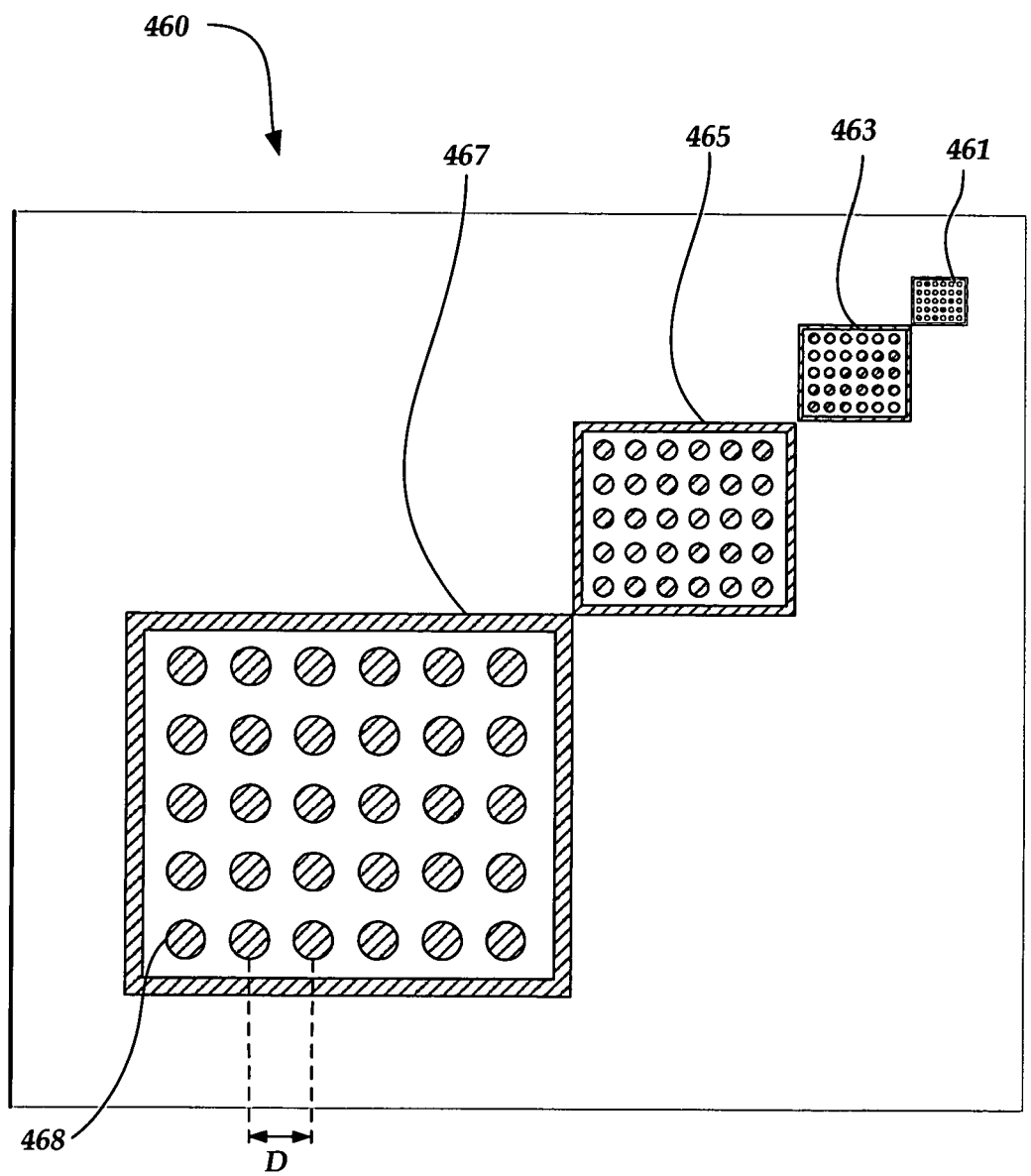
FIG. 14 shows a second embodiment of a distortion calibration target, suitable for use with various magnifications.

FIG. 14 illustrates an exemplary embodiment of a distortion calibration target 460, suitable for use as outlined herein, at various magnifications. Each of the individual calibration target patterns 461-467 includes features comprising circular dots 468 arranged at a spacing "D", as exemplified by the pattern 467 Considerations related to the size of the circular dots 468 have been previously described. The illustrated calibration target patterns are provided in four sizes, in one example for magnifications of 5×, 10×, 20×, and 30×, respectively.

In some embodiments, the patterns may be sized to approximately fill one quadrant of a field of view, and have a spacing D such that they carry a desired number of features of a desired size. In various embodiments, a pattern may include as few as 3 features, although more features generally provide better distortion calibration accuracy. It may be advantageous to include at least 9 features, and more advantageous to include at least 16 features in various embodiments. In various embodiments, the calibration target pattern that appears in each calibration image may be significantly smaller than one quarter of the FOV (for example, on the order of 1/16 of the area of the FOV, as imaged) or somewhat larger (for example, on the order of 1/3 to 1/2 of the area of the FOV, as imaged). Even larger patterns may be used, but it should be appreciated that the distortion calibration method of this invention provides greater potential accuracy when a given pattern of features can be imaged at positions that are spaced relatively far apart within the FOV. If a larger pattern is present in each calibration image, then it cannot be spaced as far apart in multiple calibration images.

As previously indicated, to provide a simple and clear outline of the invention, a simple radially symmetric distortion has been emphasized in the examples herein. However, a more comprehensive mathematical model of optical system aberrations may be used, if desired, especially in cases where the optical systems may not be diffraction limited. For example, in other embodiments, separate distortion coefficients for the x- and y-components of distortions may be used, rather than a single radial distortion parameter. Alternatively, additional distortion parameters may be added according to a Seidel lens aberration model, or the like. In such cases, procedures analogous to those described here may be used to develop the relationships and functions necessary for determining the set of distortion parameters that characterize the optical system according to the principles disclosed herein.

In addition, although the vectors used in the examples herein have been simple Cartesian vectors, more generally any practical type of intra-pattern undistorted relationship vector may be defined and appropriate relationships and functions may be determined in order to determine the distortion parameters such that the differences between corresponding undistorted relationship vectors estimated from various calibration images are minimized. For example, a more general vector may comprise one or more angular relationship terms, or "bounded area" terms (wherein various feature locations bound an area), or ratio metric terms (wherein a ratio is formed from the distances or angles between various features), or the like.

While the preferred embodiments of the invention have been illustrated and described, numerous variations in the illustrated and described arrangements of systems, components, and sequences of operations will be apparent to one skilled in the art based on this disclosure. Various aspects of the invention may be used separately, or in combinations, or in sequences other than those explicitly disclosed. Thus, it will be appreciated that various changes can be made therein without departing from the spirit and scope of the invention.

The invention claimed is:

1. A method for using an imaging system that comprises an imaging device including an array of pixels, and a first optical configuration including at least one lens, the method comprising:

determining a set of distortion parameters that accurately characterize a distortion in a field of view of the imaging system, comprising the steps of:
  providing an element including a pattern of features to be imaged in each of a plurality of respective images;
  acquiring the plurality of respective images wherein the pattern of features is presented in a plurality of respective relationships relative to the field of view in the plurality of respective images, and the pattern is nominally located in a plane that is fixed relative to the imaging system in each of the plurality of images;
  determining as-imaged positions of the features of the pattern, relative to the field of view, in the plurality of images; and
  determining the set of distortion parameters based on:
    the as-imaged positions of the features of the pattern in the plurality of images; and
    at least one mathematical relationship that is consistent with at least one member of a group of facts consisting of (a) the fact that in the absence of the distortion in the field of view the pattern of features in each of the plurality of images would be congruent, and (b) the fact that an accurate set of distortion parameters can be identified by recognizing that when they are applied to distortion-correct the positions of the same features in each of the plurality of images, an intra-pattern relationship between those distortion-corrected features will nominally be the same for each of the plurality of images.

2. The method of claim 1, wherein acquiring the plurality of respective images comprises presenting the pattern in first and second respective relationships relative to the field of view in first and second respective images, such that between the images at least two of the features of the pattern change their radial distance from the center of the field of view by at least 15% of a minimum dimension of the field of view.

3. The method of claim 2, wherein between the images at least 50% of the features of the pattern change their radial distance from the center of the field of view by at least 15% of a minimum dimension of the field of view.

4. The method of claim 3, wherein between the images at least 50% of the features of the pattern change their radial distance from the center of the field of view by at least 25% of a minimum dimension of the field of view.

5. The method of claim 2, wherein presenting the pattern in first and second respective relationships relative to the field of view consists of translating the pattern relative to the field of view between the first and second images.

6. The method of claim 1, wherein the set of distortion parameters comprises the position coordinates of a center of distortion and a radial distortion coefficient that multiplies a term that depends on a radial distance from the center of distortion.

7. The method of claim 1, wherein acquiring the plurality of respective images comprises presenting a pattern of features comprising at least 9 features in the plurality of respective images.

8. The method of claim 1, wherein acquiring the plurality of respective images comprises presenting a pattern of features wherein each feature comprises an area of at least 75 pixels and at most 1600 pixels in the plurality of respective images.

9. The method of claim 1, wherein determining the set of distortion parameters comprises minimizing a representation of a set of differences that depend on the as-imaged positions of at least some of the features of the pattern in the plurality of images and on the values of the distortion parameters.

10. The method of claim 9, comprising minimizing a representation of the set of differences wherein each of the differences depends on at least two components, wherein a first one of the components depends on the as-imaged positions of at least two features included in a first one of the plurality of images, and a second one of the components depends on the as-imaged positions of the same two features included in a second one of the plurality of images.

11. The method of claim 10, wherein the first component also depends on the values of the distortion parameters and the second component also depends on the values of the distortion parameters.

12. The method of claim 1, the method further comprising:
  acquiring an inspection image of a workpiece using the imaging system;
  determining the location of a point on the workpiece in the inspection image; and
  determining a distortion-corrected location of the point on the workpiece based on the determined set of distortion parameters.

13. The method of claim 1, the method further comprising:
  performing scale factor calibration for the imaging system, including:
    determining locations of at least two points in an image of a scale factor calibration target;
    determining distortion-corrected locations of the at least two points based the determined set of distortion parameters; and
    basing the scale factor calibration on the distortion-corrected locations of the at least two points.

* * * * *

UNITED STATES PATENT AND TRADEMARK OFFICE
CERTIFICATE OF CORRECTION

PATENT NO. : 7,656,425 B2
APPLICATION NO. : 11/395776
DATED : February 2, 2010
INVENTOR(S) : Tobiason et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,656,425 B2 |
| APPLICATION NO. | : 11/395776 |
| DATED | : February 2, 2010 |
| INVENTOR(S) | : J. D. Tobiason et al. |

It is certified that error appears in the above-identified patent and that said Letters Patent is hereby corrected as shown below:

| COLUMN | LINE | ERROR |
|---|---|---|
| 22 | 44 | "two points based the" should read --two points based on the-- |

Signed and Sealed this
Fifteenth Day of March, 2011

David J. Kappos
*Director of the United States Patent and Trademark Office*